US010822920B2

(12) United States Patent
Killie et al.

(10) Patent No.: US 10,822,920 B2
(45) Date of Patent: Nov. 3, 2020

(54) APPARATUS AND A METHOD FOR CONTROLLING FLUID FLOW IN, INTO OR OUT OF A WELL, AND AN ORIENTATION MEANS FOR ORIENTING THE APPARATUS

(71) Applicant: Innowell Solutions AS, Porsgrunn (NO)

(72) Inventors: Rune Killie, Skien (NO); Thorleif Lager, Asker (NO)

(73) Assignee: Innowell Solutions AS, Porsgrunn (NO)

( * ) Notice: Subject to any disclaimer, the term of this patent is extended or adjusted under 35 U.S.C. 154(b) by 0 days.

(21) Appl. No.: 16/344,890

(22) PCT Filed: Oct. 17, 2017

(86) PCT No.: PCT/NO2017/050268
§ 371 (c)(1),
(2) Date: Apr. 25, 2019

(87) PCT Pub. No.: WO2018/080313
PCT Pub. Date: May 3, 2018

(65) Prior Publication Data
US 2019/0264535 A1  Aug. 29, 2019

(30) Foreign Application Priority Data
Oct. 27, 2016  (NO) .................................. 20161700

(51) Int. Cl.
*E21B 34/08*  (2006.01)
*E21B 43/12*  (2006.01)
(Continued)

(52) U.S. Cl.
CPC .............. *E21B 34/08* (2013.01); *E21B 34/10* (2013.01); *E21B 43/12* (2013.01); *E21B 43/123* (2013.01); *E21B 43/32* (2013.01); *F16K 31/122* (2013.01)

(58) Field of Classification Search
CPC ............................... E21B 34/08; E21B 43/123
See application file for complete search history.

(56) References Cited

U.S. PATENT DOCUMENTS

2006/0076150 A1  4/2006  Coronado et al.
2007/0246407 A1  10/2007  Richards et al.
(Continued)

FOREIGN PATENT DOCUMENTS

EP         2383430         11/2011
WO      2012/095166        7/2012
(Continued)

OTHER PUBLICATIONS

Norwegian Search Report, Norwegian Patent Application No. 20161700, dated Apr. 28, 2017.
(Continued)

*Primary Examiner* — Cathleen R Hutchins
(74) *Attorney, Agent, or Firm* — Andrus Intellectual Property Law, LLP

(57) ABSTRACT

An apparatus and a method are for controlling a fluid flow in, into or out of a well. An orientation means is for orienting the apparatus in the well. The apparatus has a main flow channel; a chamber in fluid communication with the main flow channel, and having a flow control element movable between a first non-blocking position and a second blocking position for the fluid flow. The flow control element is movable in response to density of fluid in the chamber. The main flow channel has with pressure changing means causing a pressure differential in a fluid return conduit providing (Continued)

fluid communication between the chamber and a portion of the main flow channel, so that fluid in said chamber is recirculated back to the main flow channel when the main flow channel is open.

20 Claims, 20 Drawing Sheets

(51) Int. Cl.
    *E21B 34/10*         (2006.01)
    *E21B 43/32*         (2006.01)
    *F16K 31/122*       (2006.01)

(56) References Cited

U.S. PATENT DOCUMENTS

| | | |
|---|---|---|
| 2008/0041580 A1 | 2/2008 | Freyer et al. |
| 2008/0041582 A1 | 2/2008 | Saetre et al. |
| 2013/0068467 A1 | 3/2013 | Zhou |
| 2013/0302193 A1 | 11/2013 | Gabdullin |
| 2015/0308226 A1* | 10/2015 | Killie .............. E21B 34/10 |
| | | 166/373 |

FOREIGN PATENT DOCUMENTS

| | | |
|---|---|---|
| WO | 2014/081306 | 5/2014 |
| WO | 2015/031745 | 3/2015 |
| WO | 2015/199545 | 12/2015 |
| WO | 2016/033459 | 3/2016 |

OTHER PUBLICATIONS

International Search Report, PCT/N02017/050268, dated Nov. 27, 2017.
Written Opinion, PCT/NO2017/050268, dated Nov. 27, 2017.
Extended European Search Report for corresponding European Patent Application No. 17864917.4, issued Sep. 16, 2020.

* cited by examiner

APPARATUS AND A METHOD FOR CONTROLLING FLUID FLOW IN, INTO OR OUT OF A WELL, AND AN ORIENTATION MEANS FOR ORIENTING THE APPARATUS

CROSS-REFERENCE TO RELATED APPLICATIONS

This application is the U.S. national stage application of International Application PCT/NO2017/050268, filed Oct. 17, 2017, which international application was published on May 3, 2018, as International Publication WO 2018/080313 in the English language. The International Application claims priority of Norwegian Patent Application No. 20161700, filed Oct. 27, 2016. The international application and Norwegian application are both incorporated herein by reference, in entirety.

FIELD

The present invention is related to an autonomous inflow control apparatus. More precisely the present invention is related to an apparatus and a method for controlling fluid flow in, into or out of a well, and an orientation means for orienting the apparatus in the well. The well may for example be a gas producing well or an oil producing well.

One purpose of the apparatus is to control the inflow of various fluids that may be drained from a reservoir or utilized for preparing the well. In a well for producing gas or oil such fluids may be one or more of oil, gas and water which is drained from the reservoir, and also well construction fluids such as drilling mud and completion fluids which are used when constructing the well prior to initial start-up of production from the well.

BACKGROUND

Modern long-reach horizontal production wells for oil and gas have the objective to increase the contact to a productive reservoir. Modern drilling, both offshore and onshore, are costly operations as the initial cost of establishing a secure and cased wellbore down to the reservoir depth is mandatory, independent of the later well objective. Such wells might penetrate several thousands of meters of productive reservoir, and in order to establish desired productivity along these wellbores, proper removal of drilling fluids and other well construction fluids are required during the initial start-up and clean-up of these wells.

When oil is being produced from saturated oil segments, an influx of unwanted fluids such as gas from the overlying gas cap, or water from the underlying aquifer, is likely to occur. Such influx might be predictable or unpredictable, depending on the reservoir properties. The mobility ratio between oil and gas, or oil and water, which describes the difference in restriction against fluid flow in the reservoir, states that the least viscous fluid is restricted far less than the other fluids when flowing through a permeable reservoir. Drainage from long horizontal wells or complex, segmented, reservoirs therefore cannot be done without the risk of producing high rates of undesired gas or water.

Consequently, there is a need for an apparatus which discriminates between desired and undesired fluids.

Desired fluids in the petroleum producing industry might typically be one or more of drilling fluids, mud and completion fluids, oil, condensate or gas.

Undesired fluids might typically, but not exclusively, be gas or water.

A person skilled in the art will appreciate that fluids regarded as desired or undesired will vary depending on the purpose of the well and the operational scenario.

An apparatus discriminating between desired and undesired fluids is commonly known as an autonomous inflow control device, or simply an AICD.

An AICD can use different mechanisms to block or restrict the flow of unwanted fluids, like water and gas, from a reservoir into an oil-producing well. One possibility is to make use of viscosity differences between for example oil, water and gas.

Publications WO 2015/031745 A1 and WO 2016/033459 disclose apparatuses which mode of operation is based on the fact that different fluids having different viscosities will have different degrees of pressure recovery in an expansion section of a venturi. This difference is used either to guide the flow into different flow paths with different hydraulic resistances, or to move a device that can block or unblock the main flow path.

However, a person skilled in the art will appreciate that in many reservoirs, water and oil may have very similar viscosities. Thus, a robustness or reliability of an AICD based on the viscosity of the fluids flowing into the apparatus may be low.

A much more reliable AICD is of the type based on density differences between various types of fluids entering the apparatus.

Publication US2007246407 discloses inflow control devices for sand control screens. A well screen includes a filter portion and at least two flow restrictors configured in series, so that fluid which flows through the filter portion must flow through each of the flow restrictors. In one embodiment, US2007246407 suggests free-floating balls in annular chambers. If the fluid flowing through the chamber has the same density as the balls, the balls will start to flow along with the fluid. Unless a ball is trapped inside a recirculation zone, it will eventually be carried to an exit hole, which it blocks. Suction force will cause the ball to block the hole continuously until production is stopped. A production stop will cause pressure equalization, such that the ball can float away from the hole.

Publications US20080041580 and US20080041582 disclose apparatuses for use in subterranean wells wherein fluid is produced which includes both oil and gas, the apparatus comprising: multiple first flow blocking members, each of the first members having a density less than that of the oil, and the first members being positioned within a chamber so that the first members increasingly restrict a flow of the gas out of the chamber through multiple first outlets.

Publication WO 2015/199545 discloses an autonomous well valve having a body that constitutes an actuator for opening and closing at least one first valve opening, and where the body, that in operation is submerged, has an effective density that is equal to or greater than the density of a first fluid and less than the density of a second fluid, In order to provide an AICD for controlling fluid in or into a well without any need for power or communication with any control means outside the well, the present applicant discloses in PCT publication WO 2014/081306 A1 inter alia an apparatus comprising:

at least one housing arranged between a main inlet being in fluid communication with fluid upstream of the apparatus and a main outlet being in fluid communication with fluid downstream of the apparatus, the housing having a top portion located in an upper elevation of the housing and a bottom portion located in a lower elevation of the housing when the apparatus is in a position of use, the housing further having:
an inlet for allowing fluid flow into the housing; and
an outlet for allowing fluid flow out of the housing, the outlet being arranged in one or both of the top portion and the bottom portion of the housing; and
a flow control means disposed movably within the housing between said top portion and bottom portion, the flow control means having:
a density being higher or lower than a density of a fluid to be controlled so that a position of the flow control means within the housing depends on the density of the flow control means relative to the density of the fluid only; and
a shape adapted to substantially block the outlet of the housing when the flow control means is in a position abutting the outlet in said top portion or the bottom portion. The apparatus is further provided with a leakage means configured for allowing leakage of fluid out of at least one of a top portion and a bottom portion of the housing independent of the position of the flow control means.

Providing flow control means having a density being higher or lower than a density of a fluid to be controlled has the effect that the position of the flow control means within the housing, depends on the mutual density of the fluid and control means only. Thus, the apparatus will be fully autonomous without any need for power or communication with any control means outside the well.

Providing leakage means configured for allowing leakage of fluid out of at least one of a top portion and a bottom portion of the housing independent of the position of the flow control means has the effect that one fluid within the housing may be displaced by another fluid thereby enabling re-opening or de-activation of the flow control means after being activated.

The apparatus disclosed in WO 2014/081306 A1 functions as expected, and has been successfully tested in a laboratory.

However, when an AICD based on density differences, such as the apparatus disclosed in WO 2014/081306 A1, is open to flow, at least one of its flow control elements may typically reside in a chamber that form a deadleg that does not form part of the main flow path. When an unwanted fluid, like water or gas, starts to flow through the AICD or simply the "valve", buoyancy force causes one of the flow control elements to move from its chamber into the main flow, where it blocks the flow.

The flow control element that causes the valve to close for water, has a density somewhere between the density of oil and the density of water, typically closer to water than oil. If the fluid flowing through the valve is predominantly water, the flow control element will start to move upward and finally close the valve. If the fluid flowing through the valve is predominantly oil, but with a small fraction of dispersed water droplets, the valve should ideally remain open, but depending on the geometrical design, some water droplets might end up in the chamber containing the flow control element. If these water droplets accumulate and form a separated water layer, the flow control element will start to move upward and finally close the valve even if the water fraction of the main flow is low.

A similar challenge exists for the gas. If gas bubbles start to accumulate and form a gas cap inside the chamber containing the flow control element having a density between that of oil and gas, this flow control element will start to move downward and finally close the valve even if the gas fraction of the main flow is low.

For most oil fields, it is not desirable that an AICD closes and blocks the flow at low water or gas fractions. Accumulation and separation of the dispersed phase inside chambers containing flow control elements should therefore be avoided.

In WO 2014/081306 A1 , the leakage means will to a certain degree, reduce the problem of accumulation and separation of dispersed phase inside a chamber. However, as the leakage rate through the leakage means must be low, the hydraulic capacity of the leakage means must be very small, typically so small that they cannot be used to fully remove separated fluids at a sufficient rate during normal operation of the apparatus.

SUMMARY

The present invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect of the present invention there is provided an apparatus for controlling a fluid flow in, into or out of a well, the apparatus comprising:
a main flow channel having an inlet and an outlet being in fluid communication with the fluid flow;
at least one chamber forming part of, or connected in fluid communication with, the main flow channel, the chamber configured for housing at least one flow control element movable between a first position where the flow control element does not block the fluid flow between the inlet and the outlet of the main flow channel, and a second position within or outside of the chamber wherein the flow control element blocks the fluid flow between the inlet and the outlet of the main flow channel, the flow control element movable in response to density of fluid in said chamber. The main flow channel is provided with pressure changing means comprising an expansion section arranged in the main flow channel, the expansion section having an inlet with a smaller cross sectional flow area than a cross sectional flow area at an outlet, the pressure changing means providing a pressure differential in a fluid return conduit extending between said chamber at a location wherein the flow control element is in the non-blocking position and a portion of the main flow channel being within or upstream of the pressure changing means, so that fluid in said chamber is recirculated back to the main flow channel when the main flow channel is open.

Preferably, the pressure changing means is arranged upstream of the at least one chamber. The fluid return conduit may extend from said chamber at a location wherein the flow control element is in the non-blocking position to a portion of the main flow channel being upstream of said chamber.

The apparatus according to the present invention is suitable for controlling fluid flowing in, into or out of a well as will be apparent in what follows. The well may for example be an oil producing well.

One important effect of the pressure changing means and the fluid return conduit, is that the risk of undesired blockage of the fluid flow in, into or out of a conduit, such as for example a well in the petroleum industry, is at least reduced. The reason for this is that as long as undesired fluid accumulated in the chamber is returned from the chamber via the fluid return conduit back to the main flow, the flow control element will remain in a non-blocking position within the chamber.

However, when an amount of undesired fluid flowing into the apparatus exceeds a predetermined volume fraction, the return rate of accumulated fluid in the chamber will be less than the rate at which the undesired fluid accumulates in the chamber. The return rate may for example be determined by the flow capacity of the fluid return conduit which depends inter alia on its internal cross-section area and its length. When the return rate of accumulated fluid in the chamber is less than the rate at which the undesired fluid accumulates in the chamber, the chamber will be filled with fluid effecting movement of the flow control means from the first non-blocking position to the second blocking position for the fluid flow between the inlet and the outlet of the main flow channel.

The flowrate at which the fluid is returned from the chamber and back into the main flow, depends on the flow rate in the main flow channel, the hydraulic capacity of the fluid return conduit and the geometrical design of the pressure changing means.

As mentioned above, the pressure changing means is provided by means of an expansion section arranged in the main flow channel, and the expansion section has an inlet with a smaller cross sectional flow area than a cross sectional flow area at an outlet.

The pressure changing means may further comprise a vena contracta arranged upstream of the expansion section. The pressure changing means may thus be a venturi for providing a suction device for a conduit in fluid communication with the vena contracta.

The pressure changing means of the above mentioned types, effects a differential pressure depending on the flow rate therethrough; a high flowrate will effect a high differential pressure, while there will be no differential pressure when there is no flow therethrough.

In order to be capable of controlling at least two fractions of a fluid, the apparatus may comprise at least two flow control elements of different characteristics. In one embodiment, each of the at least two flow control elements may be arranged in separate chambers arranged in series between the inlet and the outlet of the main flow channel. In another embodiment, two flow control elements having different responsiveness to density of fluid, are arranged in a common chamber.

A movement path of the flow control element between the first non-blocking position and the second blocking position may be controlled by a guiding means.

In a preferred embodiment, the guiding means may be a guiding channel with a closed first end portion and an open second end portion, the second end portion being in fluid communication with a portion of the main flow channel for allowing the flow control element to move into the main flow channel and sealingly abut a flow control element movement stopping device arranged downstream of the open second end portion of the guiding channel.

In an alternative embodiment, the guiding means may comprise a guiding fence for preventing movement of the flow control element outside the desired movement path, the guiding fence being arranged downstream of the pressure changing means but upstream of the at least one flow control element, and thus the outlet of the main flow channel. The guiding fence allows fluid flow therethrough.

The fluid return conduit may be connected to the guiding channel in a portion being closer to the first end portion of the guiding channel than the second end portion of the guiding channel. This has the effect that undesired fluid accumulated in the guiding channel is returned from at least an upper half of the guiding channel. In one embodiment, the fluid return conduit is connected to the first end portion of the guiding channel to allow return of substantially any undesired fluid accumulated in the guiding channel.

The guiding channel may further be provided with a leakage channel being in fluid communication with a portion of the outlet of the main flow channel. The effect of such a leakage channel is that the undesired accumulated fluid that has moved the flow control element out of the channel, is drained so that the flow control element is allowed to re-enter the guiding channel. The leakage channel has a similar effect as the leakage means disclosed in WO 2014/081306 A1 to the present applicant. The leakage channel should be as small as possible, but sufficiently large to allow passage of the largest expected particles flowing through the apparatus so that blockage of the leakage channel is prevented.

The fluid return conduit may be provided with a branching having an end portion being in fluid communication with the guiding channel. The end portion is preferably arranged complementary to a surface portion of the flow control element abutting a wall of the guiding channel when in the first non-blocking position. This has the effect that a suction force will be created against the flow control element. The suction force will provide a certain resistance against movement of the flow control elements, thereby reducing the risk of accidental closing of the valve during normal production such as for example when oil (with any dispersed water and/or gas) is flowing through the valve. As will be discussed below, the suction force may be adapted to specific needs.

When the valve is open to flow, its flow control elements will reside in a first position in the chambers. As will be explained below, the chambers may in one embodiment comprise deadlegs that extend from a side portion of the main flow channel. In such an embodiment, the deadlegs do not form part of the main flow channel. In another embodiment, the chamber may form part of the main flow channel.

A person skilled in the art will understand that an AICD based on density, such as the apparatus according to the first aspect of the present invention, needs to be correctly oriented with respect to a gravity vector in horizontal or near-horizontal sections of the well.

Most oil and gas reservoirs are much more extensive in their horizontal (areal) dimensions than in their vertical (thickness) dimension.

By the term horizontal or near-horizontal sections of a well is meant a well extending in said areal dimensions of a reservoir, typically within +/−10° from horizontal.

In accordance with a second aspect of the present invention, there is provided an orientation means for orienting the apparatus according to the first aspect, in horizontal or near-horizontal sections of a well, wherein the orientation means comprises:
  an inner pipe element having an inner surface for communicating fluid with a base pipe, and an outer surface;
  a rotation device connected to a portion of the inner pipe element;
  a housing for enclosing at least a portion of the inner pipe element, the rotation device and the apparatus being connected to the inner pipe element, the housing being arranged coaxially with the inner pipe element and configured for allowing rotation of the inner pipe element with respect to the housing; and locking means arranged between an inner surface of the housing and the outer surface of the inner pipe element, the locking means being reactive to a fluid flowing in the apparatus such that rotation of the first pipe element is prevented upon activation of the locking means.

The locking means may comprise one of or a combination of a swell packer and a lip seal. A swell packer will seal, and thus lock against rotation, gradually, whereas a lip seal will seal, and thus lock against rotation, once there is a pressure differential across the lip seal.

The rotation device may comprise a weight element connected to a portion of a circumference of the outer surface of the inner pipe element. Such a weight element may typically be arranged to provide a self-orientation of the inner pipe, and thus any apparatus connected thereto.

Alternatively, the rotation device may comprise a guide track fixedly connected to an inner surface of the inner pipe element, wherein the guide track is adapted to receive an external orientation tool run into the well.

In one embodiment, the orientation means may comprise a combination of a weight element and a guide track. In such an embodiment, the guide track may serve as a backup if a self-rotation by means of the weight element should fail.

In a third aspect of the present invention there is provided a method for controlling fluid flow in, into or out of a well, wherein the method comprising the steps of:

mounting an apparatus according to the first aspect of the invention as part of a well completion string prior to inserting the string in the well;

bringing the well completion string into the well;

orienting the apparatus within the well; and flowing fluid in, into our out of the well.

Preferably, the apparatus is oriented within the well by the orientation means according to the second aspect of the invention. Thus, the apparatus may be connected to the orientation means which forms part of a separate pipe unit configured to be inserted between two subsequent pipe stands, as will be discussed below.

BRIEF DESCRIPTION OF THE DRAWINGS

In the following is described examples of preferred embodiments illustrated in the accompanying drawings, wherein:

FIG. 13b shows a cross-sectional view taken along a longitudinal axis of the orientation means in FIG. 13a; and FIG. 13c is an exploded view of the orientation means in FIG. 13a.

DETAILED DESCRIPTION OF THE DRAWINGS

Figure 1:
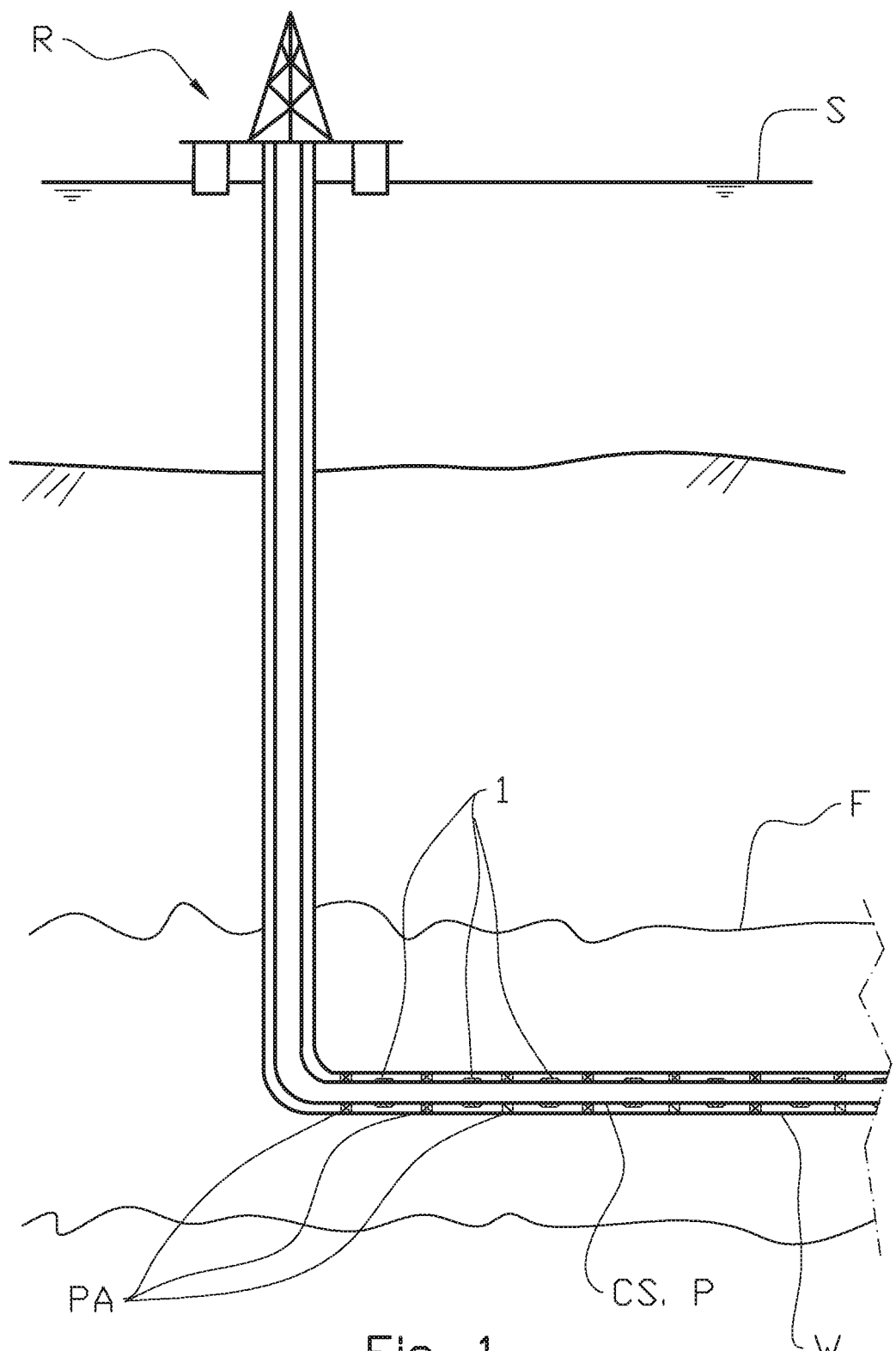
FIG. 1 shows a principle sketch of a typical subsea well having a plurality of apparatuses according to the present invention distributed along a horizontal section of the well.

Positional indications such as for example "above", "below", "upper", "lower", "left", and "right", refer to the position shown in the figures.

In the figures, same or corresponding elements are indicated by same reference numerals. For clarity reasons some elements may in some of the figures be without reference numerals.

A person skilled in the art will understand that the figures are just principle drawings. The relative proportions of individual elements may also be strongly distorted.

In the figures, the reference numeral 1 denotes an apparatus according to a first aspect of the present invention. In what follows, the apparatus will also be denoted valve 1.

FIG. 1 shows a typical use of the valve 1 in a well completion string CS arranged in a substantially horizontal wellbore W penetrating a reservoir F. The well W is in fluid communication with a rig R floating in a surface of a sea S. The well W comprises a plurality of zones separated by packers PA as will be appreciated by a person skilled in the art. A person skilled in the art will understand that the well may alternatively be an onshore well.

Figure 2:
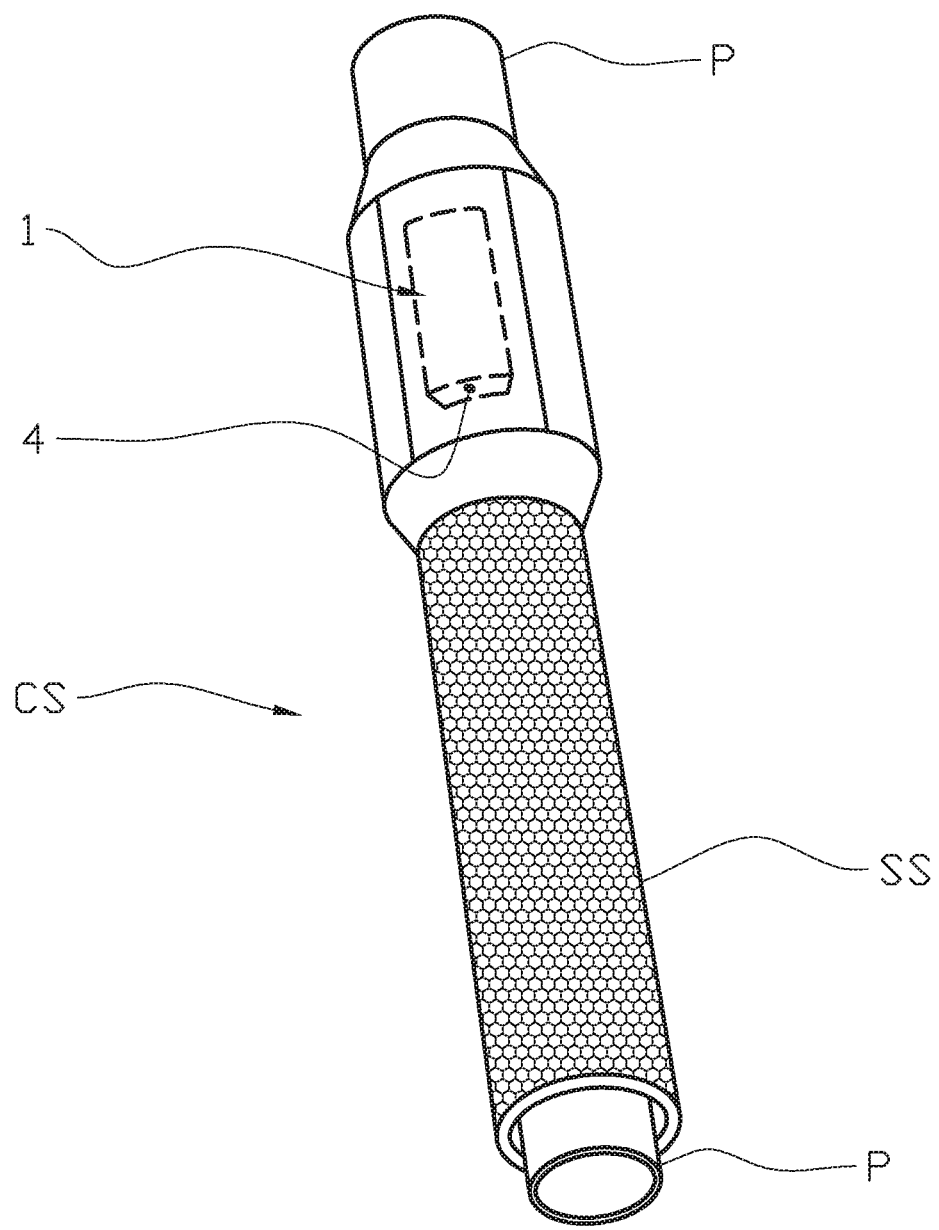
FIG. 2 shows in larger scale a perspective view of a pipe stand comprising a base pipe and a screen, and an apparatus according to the present invention.

FIG. 2 shows a typical arrangement of the valve 1 in a portion of a well completion string CS. The valve 1 is positioned between a basepipe P and a sandscreen SS.

The valve 1 may form part of a so-called pipe stand having a typical length of approximately 12 meters. However, the valve 1 may also be arranged in a separate pipe unit having a typical length of only 40-50 centimeters. Such a unit may be configured to be inserted between two subsequent pipe stands. A separate pipe unit comprising an orientation means for orienting the valve 1 according to the present invention is disclosed in FIGS. 13a to 13c.

Figure 3:
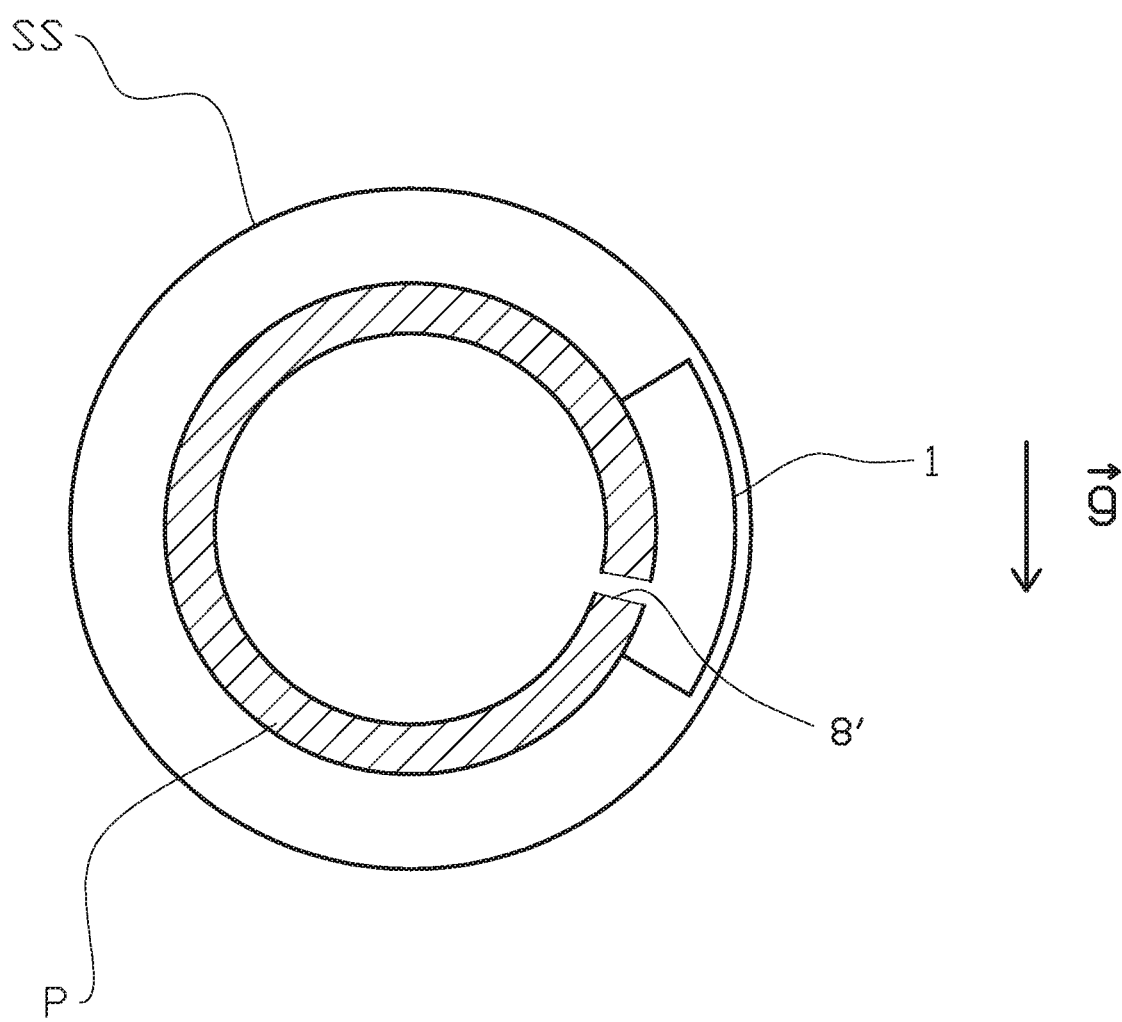
FIG. 3 shows in larger scale a principle cross section through a portion of FIG. 2.

FIG. 3 shows a cross section of the completion string CS and a typical placement of a valve 1. The placement shown in FIG. 3 is optimal with respect to the gravitational vector g, but rotation around the longitudinal axis of the basepipe P up to a certain angle is acceptable. As the valve 1 is orientation dependent, proper orientation of the valve 1 around the axis of the basepipe P is required in horizontal or near-horizontal sections of the well W. In vertical or deviated sections of the well, orientation around the axis of the basepipe P might not be required.

FIGS. 4a to 4d illustrate a working principle of an apparatus having some common features with the apparatus according to the present invention, shown in four scenarios where four different fluids flow through the valve. This principle is based on the same principle as disclosed in WO 2014/081306 A1 to the applicant.

In FIGS. 4a to 4d, an autonomous inflow control device, AICD, or valve 1, is configured for different stages of the well life of an oil producing well.

The direction of fluid flow into and out of the valve 1 is indicated by arrows. The valve 1 comprises a housing (not shown in FIGS. 4a to 4d) provided with a main flow channel 5 having an inlet 4 and an outlet 8 being in fluid communication with a fluid flowing in or into a well W.

Downstream (to the right) of the inlet 4, the main flow channel 5 is divided into two flow channel branches, an upper flow channel 5U and a lower flow channel 5L, both terminating in the outlet 8.

The upper flow channel 5U is in fluid communication with a first chamber 50 and a second chamber 53. The lower flow channel 5L is in fluid communication a third chamber 57.

Each of the chambers 50, 53, 57 are formed as channels with a closed first end portion 51, 54, 58, respectively, and an open second end portion 52, 55, 59, respectively. The open second end portions 52, 55 of the first chamber 50 and second chamber 53, respectively, are in fluid communication with the upper flow channel 5U. The open second end portion 59 of the third chamber 57 is in fluid communication with the lower flow channel 5L. Thus, the chambers 50, 53 and 57 form deadlegs extending from the main flow channel 5. The chambers will therefore also be denoted deadlegs 50, 53, 57.

The purpose of each of the deadlegs 50, 53, 57 is to provide a housing for a flow control element 500, 530, 570 when in an "inactive" position outside the flow channels 5L, 5U and guiding means for guiding the flow control elements 500, 530, 570 out of the deadlegs 50, 53, 57 and into the flow channels 5L, 5U as will be explained below.

In the shown embodiment, the flow control elements 500, 530 and 570 are spherical or ball-shaped. Although spherical flow control elements may be preferred, the flow control elements may have another form as will be discussed below.

All three flow control elements, or balls, 500, 530, 570 have different density.

The embodiment shown in FIGS. 4a to 4d is directed towards a petroleum well, wherein the apparatus is configured for controlling the inflow of mud, oil, water and gas.

During initial start-up/cleanup of a well, the flow will substantially comprise well construction fluids or mud. After some time, the well construction fluid will be cleaned out and reservoir fluid will start to flow. In the configuration shown in FIGS. 4a to 4d, the valve 1 is designed to let through mud and oil, and restrict gas and water from the reservoir.

In such an embodiment the first ball 500 arranged for the first chamber 50, has a density between the density of water (~1000 kg/m$^3$) and oil (~600 kg/m$^3$), for example about 800 kg/m$^3$.

The second ball 530 arranged for the second chamber 53, has a density between the density of oil (~600 kg/m$^3$) and gas (~200 kg/m$^3$), for example about 400 kg/m$^3$.

The third ball 570 arranged for the third chamber 57, has density between the density of water (~1000 kg/m$^3$) and mud (~1400 kg/m$^3$), for example about 1200 kg/m$^3$.

Downstream of each of the first deadleg 50 and second deadleg 53, the upper flow channel 5U is provided with a flow control element movement stopping device in the form of first ball receiving means 501 and a second ball receiving means 531, respectively. Similarly, downstream of the third deadleg 57, the lower flow channel 5L is provided with a third ball receiving means 571.

The purpose of the ball receiving means 501, 531, 571 is to receive a portion of a surface of the ball to block a fluid flow through the ball receiving means. Thus, the ball receiving means 501, 531, 571 are adapted to the shape of the flow control elements, such as the shown balls 500, 530, 571.

For illustrative purpose, the ball receiving means 501, 531, 571 are shown somewhat exaggerated. The ball receiving means 501, 531, 571 should have as great opening as possible without the risk of wedging the respective ball.

As mentioned above, in FIGS. 4a to 4d the density of the first ball 500 is higher than that of gas and oil, but lower than that of mud and water. The density of the second ball 530 is higher than that of gas, but lower than that of mud, oil and water. The density of the third ball 570 is higher than that of oil, water and gas, but lower than that of mud. The mud may for example be drilling mud or a well construction mud.

Figure 4A:
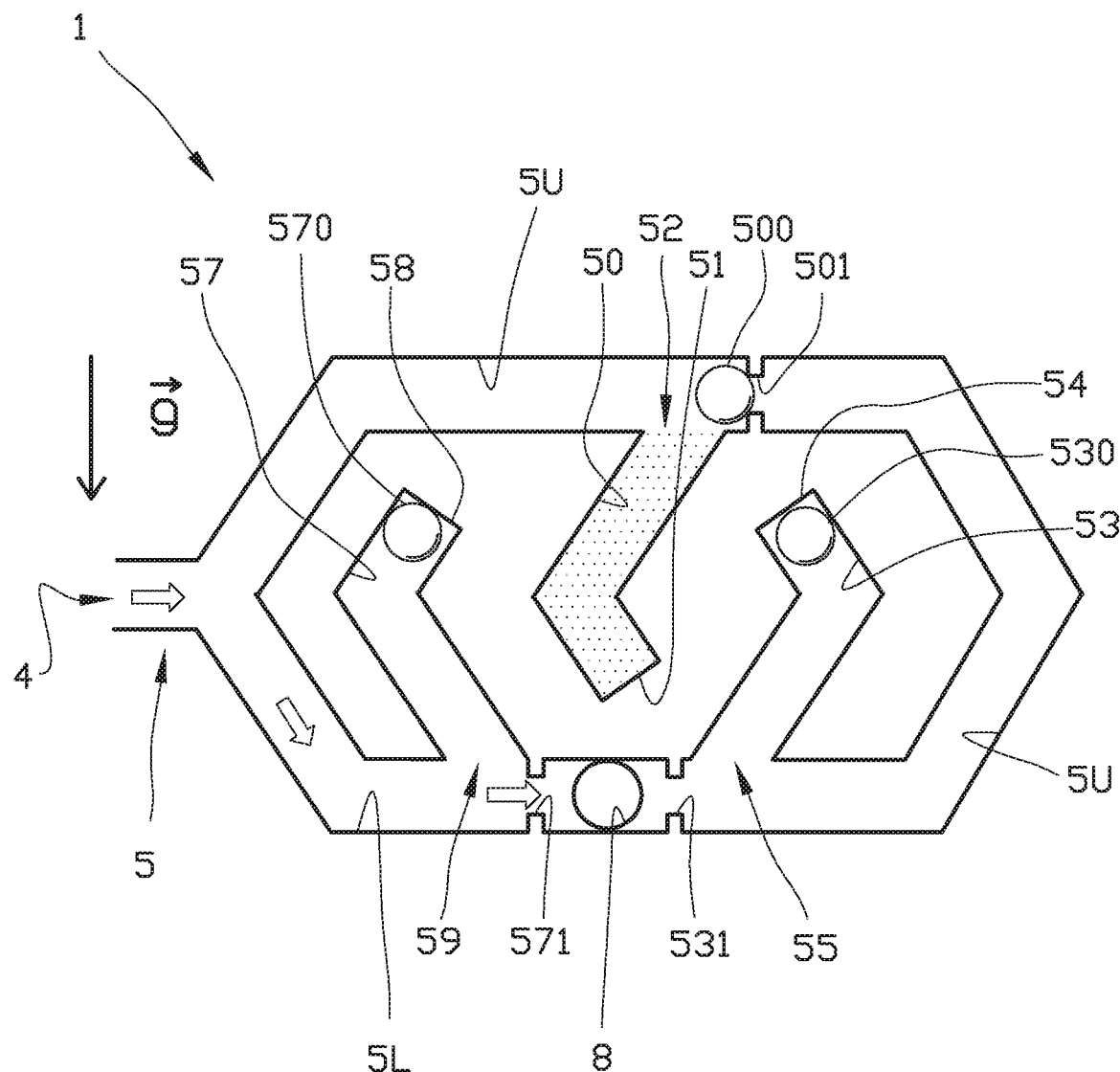
FIGS. 4a-4d illustrate a working principle of an apparatus in four scenarios where four different fluids flow through the valve, the apparatus having some common features with the apparatus according to the present invention.

FIG. 4a shows a scenario where mud is flowing through the valve 1 from the main inlet 4, via lower flow channel 5L to the main outlet 8. This is a typical situation during initial well start-up/cleanup, wherein the well starts flowing construction fluid through the main inlet 4 to the main outlet 8. Due to the density of mud being higher than that of the first ball 500 arranged for the first chamber 50, the first ball 500 will move from a position at a bottom portion of the chamber or deadleg 50, to a second position out of the deadleg 50 as the deadleg 50 is filled with mud (indicated by dots). In the second position, the first ball 500 will abut the first ball receiving means 501 in the upper flow channel 5U. The upper flow channel 5U will thus be blocked. The third ball 570 has a density lower than that of mud, and will thus float in top of, i.e. at the closed first end portion 58 of the third channel or deadleg 57.

Figure 4B:
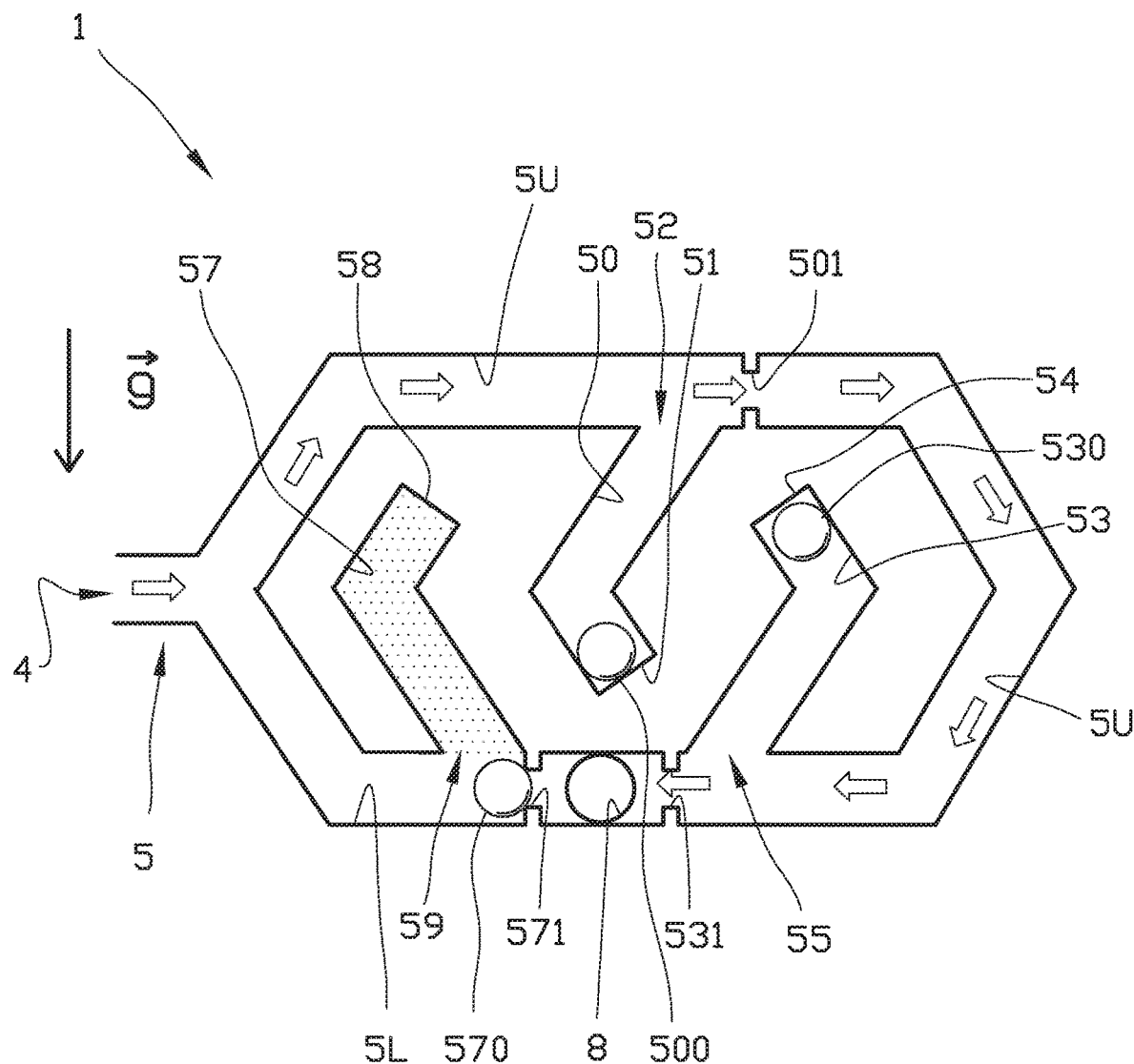

FIG. 4b shows a scenario where oil is flowing through the valve 1 from the main inlet 4, via upper flow channel 5U to the main outlet 8. Due to the density of oil being lower than that of the third ball 570 arranged for the third deadleg 57, the third ball 570 will, as the third deadleg 57 is filled with oil (indicated by dots), move from the position shown in FIG. 4a, to the position shown in FIG. 4b, wherein the third ball 570 abuts the ball receiving means 571 at the outlet 8. The lower flow channel 5L is therefore blocked.

Figure 4C:
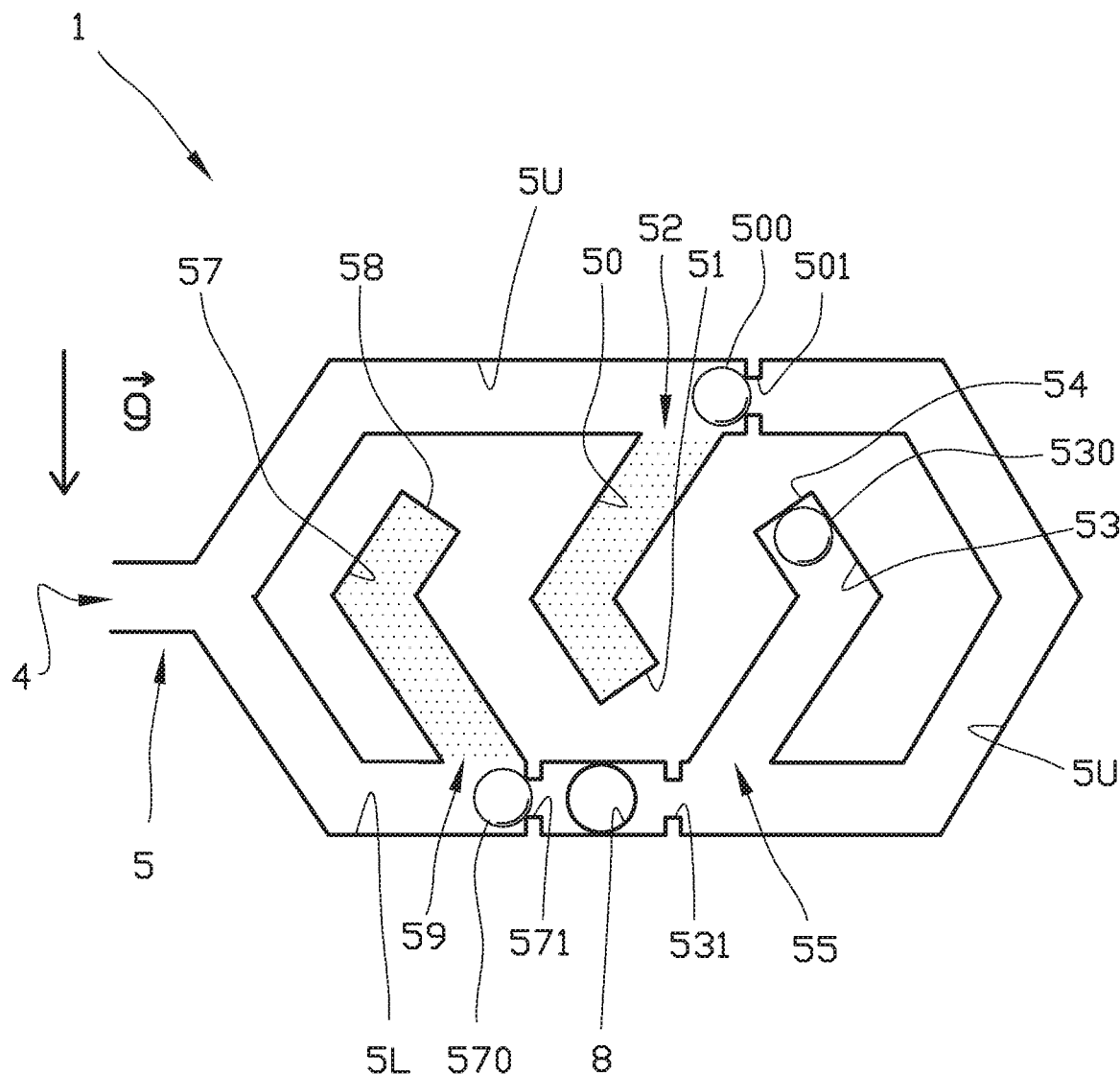

FIG. 4c shows a scenario where water has entered the valve 1, for example due to so-called water coning. The first ball 500, having a density lower than that of water (indicated by dots), has moved to a blocking position for water flow in the upper flow channel 5U. The third ball 570, having a density higher than that of water, has moved to a blocking position in the lower flow channel 5L. Thus, the fluid flow through the valve 1 has been blocked.

Figure 4D:
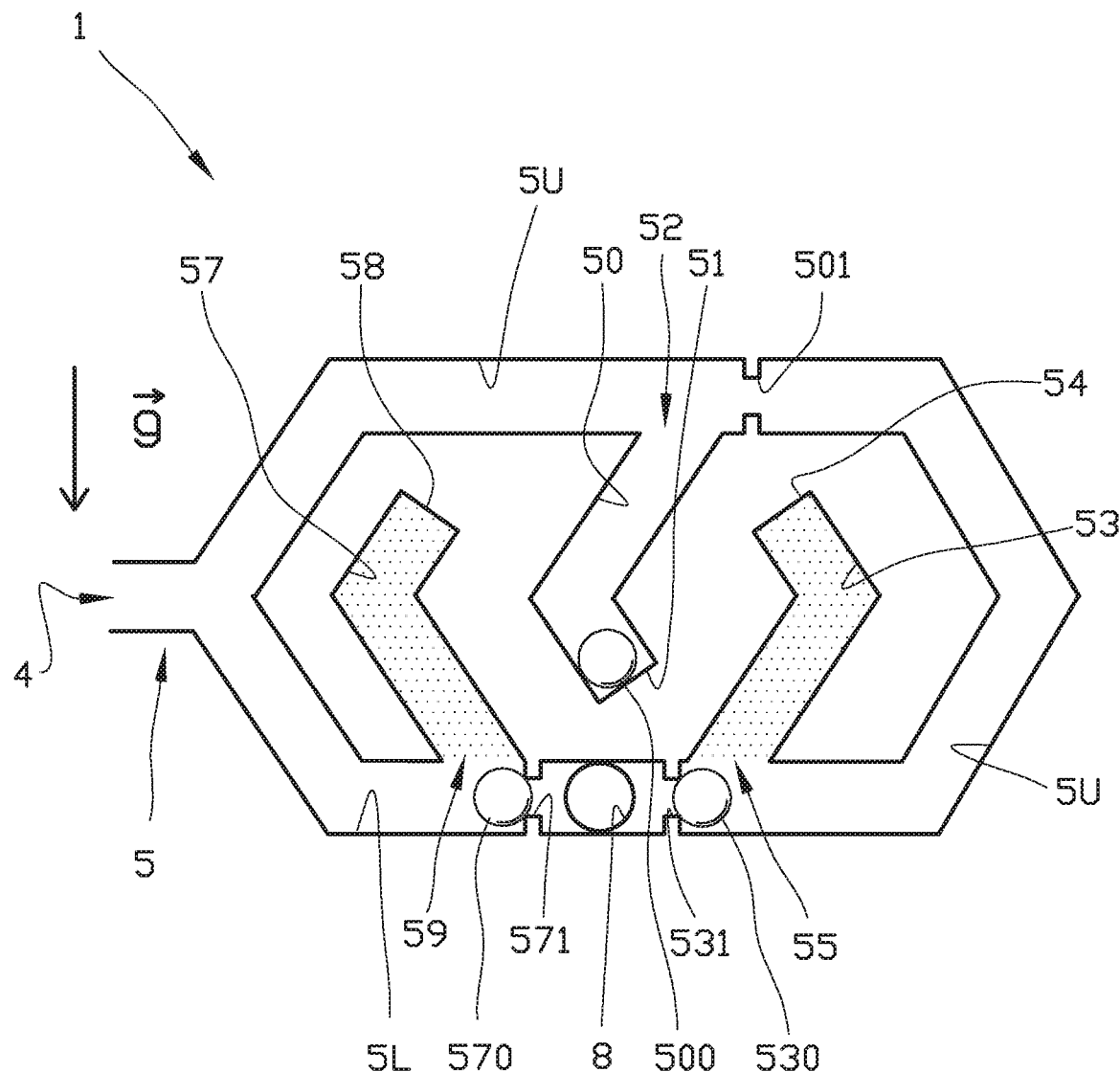

FIG. 4d shows a scenario for example in a later stage of well life where gas has entered the valve 1, for example due to so-called gas coning. The first ball 500, having a density higher than that of gas, remains in a bottom or closed first end portion 51 of the deadleg 50. The fluid, i.e. gas (indicated by dots) in this scenario, has filled the second deadleg 53. The second ball 530, having a density higher than that of gas, has moved out of the deadleg 53 to a blocking position wherein the second ball 530 abuts the ball receiving means 531 downstream of the deadleg 53. Thus, the second ball 530 prevents fluid flow through the upper flow channel 5U. The third ball 570, having a density higher than that of gas, has moved to a blocking position in the lower flow channel 5L. Thus, the fluid flow through the valve 1 has been blocked.

The scenarios in FIGS. 4a to 4d relates to an ideal flow situation wherein mud only, oil only, water only and gas only, respectively, flows into the valve 1. However, a person skilled in the art will appreciate this is normally not the reality.

For example, oil flowing into the valve from an oil producing formation may typically comprise a fraction of dispersed water droplets and/or gas bubbles. Such water-and/or gas "contaminated" oil is accepted and treated by means of a separator (not shown) known per se, for example on a rig R (see FIG. 1) or on a vessel.

However, referring to for example FIG. 4c, one challenge with the disclosed valve 1 is that some water droplets will enter into the first chamber or deadleg 50 if the oil comprises dispersed water droplets. Due to the density of water being higher than the density of oil, the deadleg 50 will receive increasingly more water as productions goes on. Water "trapped" in the deadleg 50 will eventually result in a rise of the first ball 500 until it leaves the deadleg 50 and blocks the upper flow channel 5U, despite of an acceptable water/oil ratio of the main flow.

Such a blockage is highly undesirable as it prevents draining of a formation F (see FIG. 1).

Similarly, some gas bubbles may rise into the second chamber or deadleg 53, where they are trapped. As more and more bubbles are trapped, they form a continuous gas layer inside the deadleg 53. The gas layer building up inside the deadleg 53 will expel oil therein and the level of oil which "carries" the second ball 530, will be reduced until the second ball 530 leaves the deadleg 53 and abuts the ball receiving means 531. The valve 1 will then close even if the gas fraction in the main flow is within an acceptable level.

There is thus a need for a drainage means for draining any trapped fluid that may cause an undesired blockage of the main flow channel 5.

Figure 5:
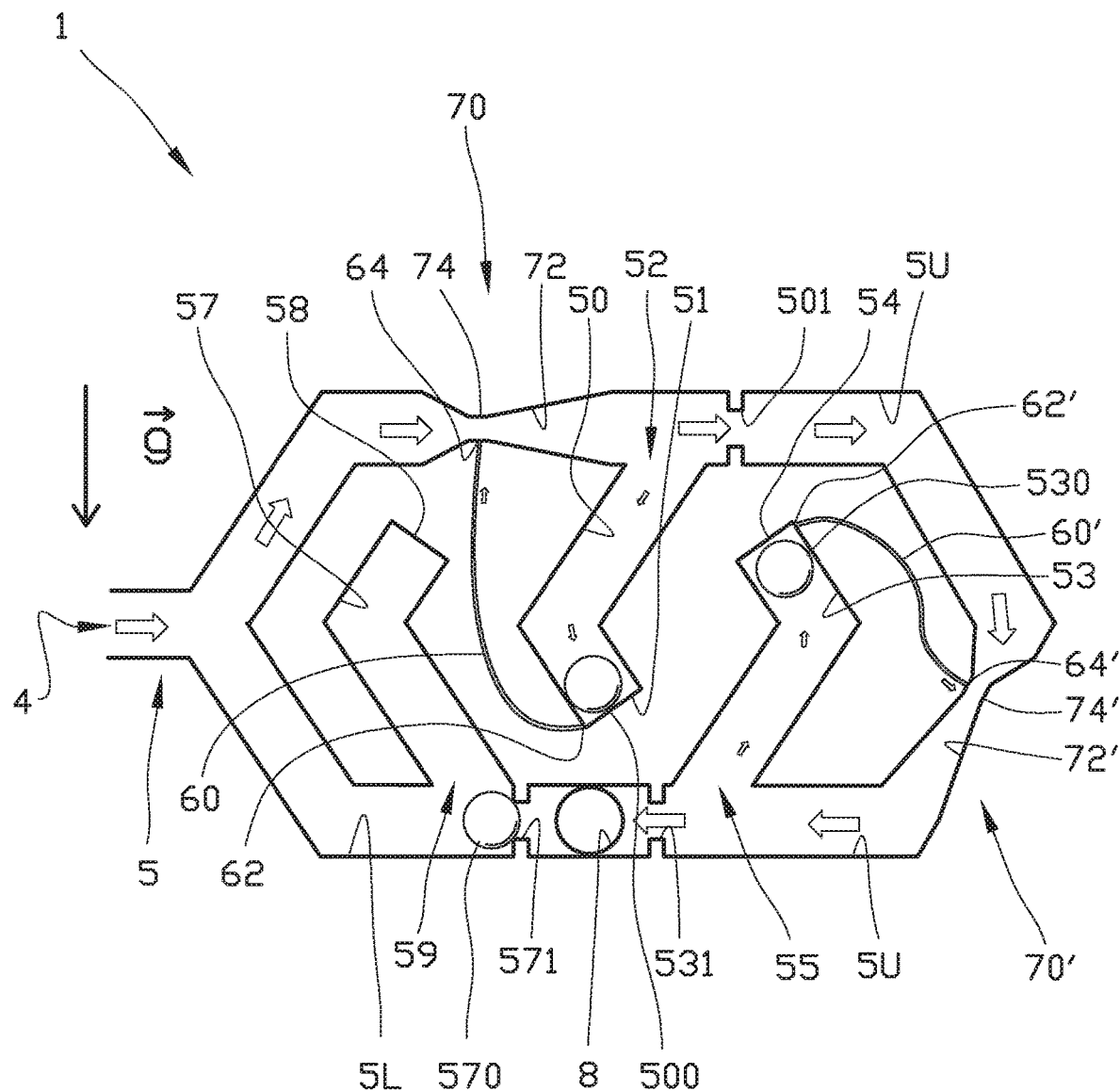
FIGS. 5-8 show various embodiments of the apparatus according to the present invention in a scenario where oil flows through the apparatus.

FIG. 5 shows an embodiment of the present invention wherein drainage means are connected to the first chamber or deadleg 50 and the second chamber or deadleg 53.

FIG. 5 shows the same flow situation as shown in FIG. 4b, i.e. a situation where for example oil is flowing through the valve 1.

The drainage means comprises a first fluid return conduit 60 having a first end portion 62 being in fluid communication with the first end portion 51 of the first deadleg 50. A second end portion 64 of the first fluid return conduit 60 is in fluid communication with a pressure changing means 70 arranged in a portion of the upper flow channel 5U upstream (to the left) of the first deadleg 50. The pressure changing means 70 comprises an expansion section 72 and a vena contracta 74 arranged upstream of the expansion section 72. Thus, in the embodiment shown the pressure changing means 70 is a Venturi tube.

The second deadleg 53 is provided with a similar drainage means. The drainage means comprises a second fluid return conduit 60' having a first end portion 62' being in fluid communication with the first end portion 54 of the second deadleg 53. A second end portion 64' of the second fluid return conduit 60' is in fluid communication with a pressure changing means 70' arranged in a portion of the upper flow channel 5U upstream (to the right) of the second deadleg 53. The pressure changing means 70' comprises an expansion section 72' and a vena contracta 74' arranged upstream of the expansion section 72'.

It should be noted that the first end portion 62, 62' of the fluid return conduits 60, 60' could extend from any position along the deadlegs 50, 53 sufficient to provide removal of undesired trapped fluid before the balls 500 and 530 are urged into the upper flow channel 5U. The first end portions 62, 62' of the fluid return conduits 60, 60' should therefore not be closer to the second end portions 52, 55 of the deadlegs 50, 53 than about half the diameter of the balls 500, 530. However, in order to provide a "secure" drainage of the deadlegs 50, 53, it is preferred that the first end portions 62, 62' of the fluid return conduits 60, 60' are closer to the first end portions 51, 54 of the deadlegs 50, 53 than to the second end portions 52, 55 of the deadlegs 50, 53. The arrangement shown in FIG. 5 wherein the fluid return conduits 60, 60' are arranged at the first end portions 62, 62' of the deadlegs 50, 53 is the most preferred embodiment as this will provide drainage or "recirculation" of all fluid within the deadlegs 50, 53, and the best "buffer" for handling short periods of higher water/oil ratio in the main flow.

A person skilled in the art will appreciate that the Venturi tube will provide a suction in the fluid return conduits 60, 60' that depends on the fluid flow rate through the Venturi. Thus, the higher flow rate in the main flow, the higher flow rate through the fluid return conduits 60, 60'. If there is no flow, there will be no fluid flow through the return conduits 60, 60'.

Figure 6:
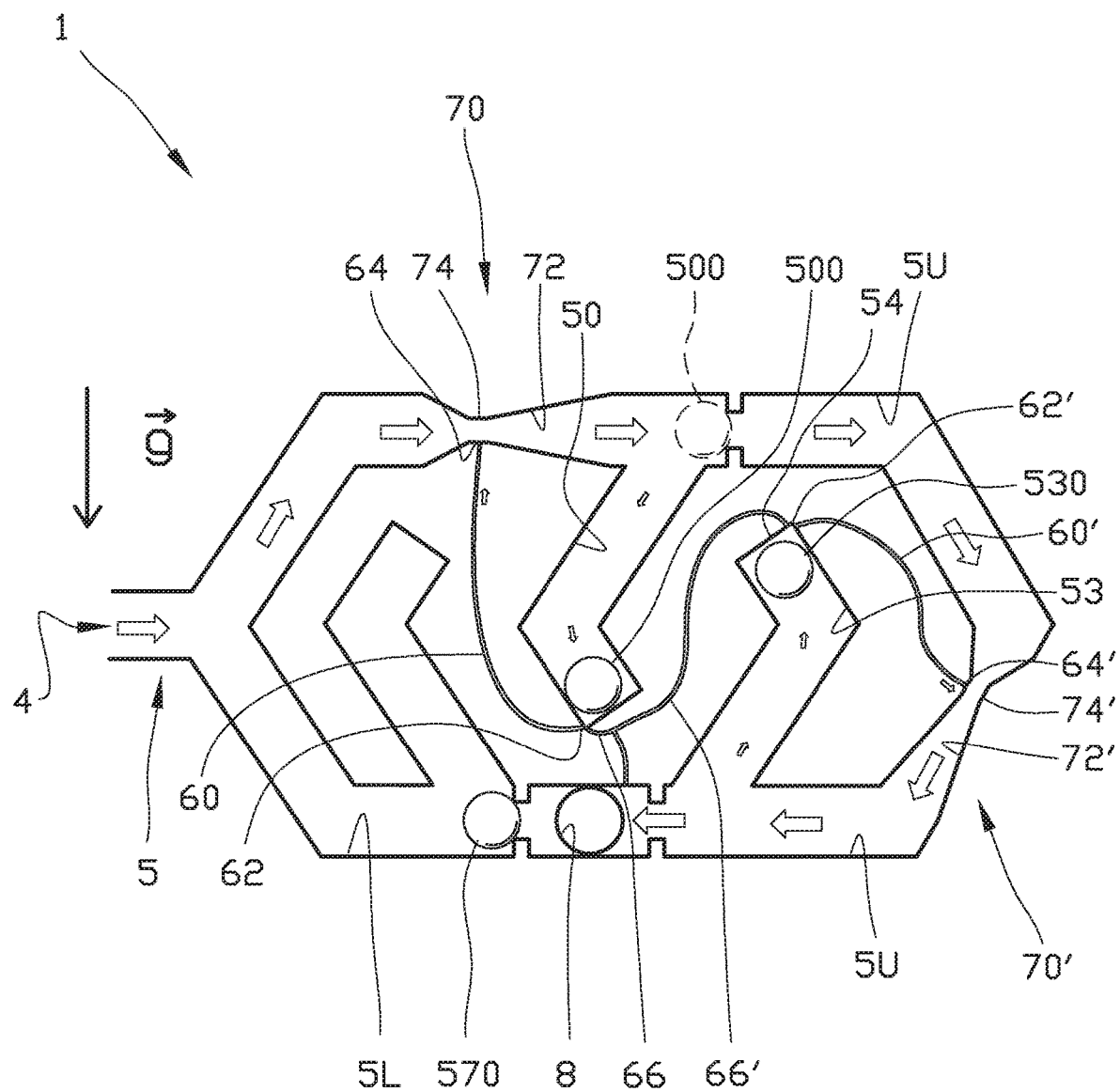

Turning now to FIG. 6. If the valve 1 is closed by the first ball 500 because of water flowing through the valve 1, the ball 500 will block the upper flow channel 5U as indicated by the ball 500 drawn with dashed lines. In such a situation, there will be no flow through the valve 1 and, consequently, no drainage of the first deadleg 50.

In order to reopen the valve 1 for flow if oil later on comes back, the ball 500 must be allowed to re-enter the deadleg 50 as shown with the ball 500 drawn with continuous line. The water in the deadleg 50 must then be drained away.

To allow such drainage of water, there is arranged a leakage channel or drain line 66 providing fluid communication between the first end portion 51 of the first deadleg 50 and the outlet 8 of the valve 1.

The drain line 66 will provide a certain drainage of the deadleg independently of any fluid flow through the valve 1.

Similarly, if the valve 1 is closed because of gas, the second deadleg 53 must be drained to allow reopening of the valve 1 for flow if oil comes back. A drain line 66' for draining any gas is therefore arranged for providing fluid communication between the first end portion 54 of the second deadleg 53 to the outlet 8 of the valve 1.

In the embodiment shown, the "water drain line" 66 is merged with the "gas drain line" 66'. The reason for this is to avoid an undesirably high flow rate through the lines 66, 66' when the valve 1 is closed. The leakage rate may be further reduced by increasing the length of the drain lines 66, 66'.

The drain lines 66, 66' have a similar effect as the leakage means disclosed in WO 2014/081306 A1 to the present applicant. As mentioned previously, the drain lines should be as small as possible, but sufficiently large to allow passage of the largest expected particles flowing through the apparatus so that blockage of the drain lines may be prevented.

When the valve 1 is open as shown in FIG. 6, the flow rates through the drain lines 66, 66' will, for the above reasons, be too low to avoid accumulation of water in the first deadleg 50 and accumulation of gas in the second dead leg 53. Thus, the flow-dependent drainage means comprising pressure changing means 70, such as the Venturi and fluid return conduits 60, is useful also in combination with the drain lines 66, 66'.

Figure 7:
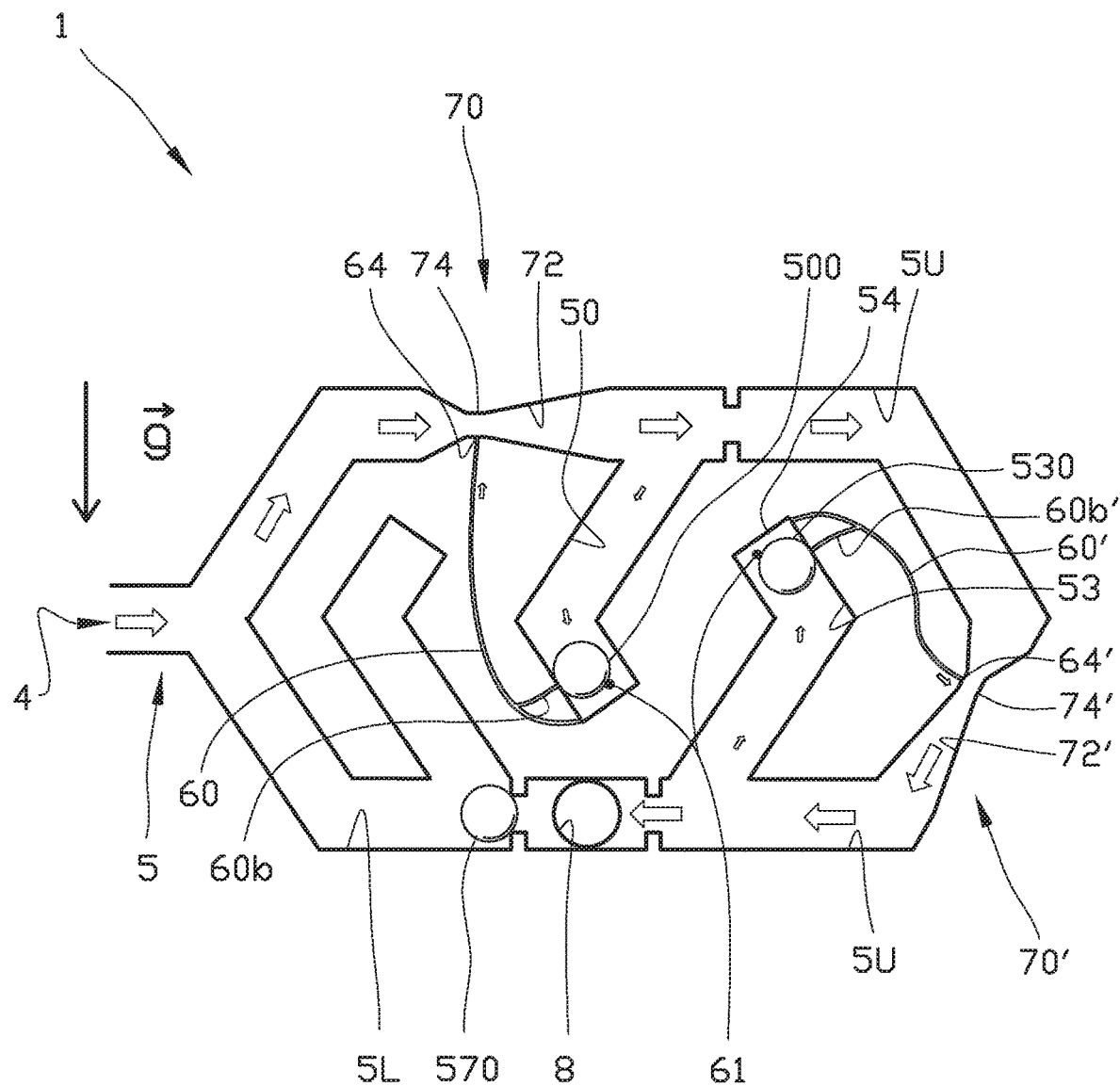

FIG. 7 resembles FIG. 5, but with the addition of a ball-retaining device arranged in the first deadleg 50 and in the second dead leg 53. The ball-retaining device for the first deadleg 50 comprises a fluid line 60b providing fluid communication between a portion of the fluid return conduit 60 and the deadleg 50. Similarly, the ball-retaining device for the second deadleg 54 comprises a fluid line 60b' providing fluid communication between a portion of the fluid return conduit 60' and the deadleg 53. Thus, said fluid lines 60b, 60b' form branches from the fluid return conduits 60, 60', respectively.

The purpose of the ball-retaining device is to provide a certain resistance against movement of the balls 500, 530, thereby reducing the risk of accidental closing of the valve 1 during normal production. In the scenario illustrated in FIG. 7, normal production is when oil (with any dispersed water and/or gas) is flowing through the valve 1.

The resistance against movement is achieved by a suction force from the fluid lines 60b, 60b' acting on a surface portion of the balls 500, 530, respectively. To provide a highest possible suction force, an aperture connecting the fluid lines 60b, 60b' to the deadlegs 50, 53, respectively is preferably complementary to a surface portion of the balls 500, 530. Each of the deadlegs 50, 53 is further provided with positioning means for securing an optimal position of the balls with respect to the aperture and thus the fluid lines 60b, 60b'. The positioning means is shown as a protuberance 61 within each of the first dead leg 50 and second dead leg 53. The protuberance 61 may for example be a rod.

Figure 9:
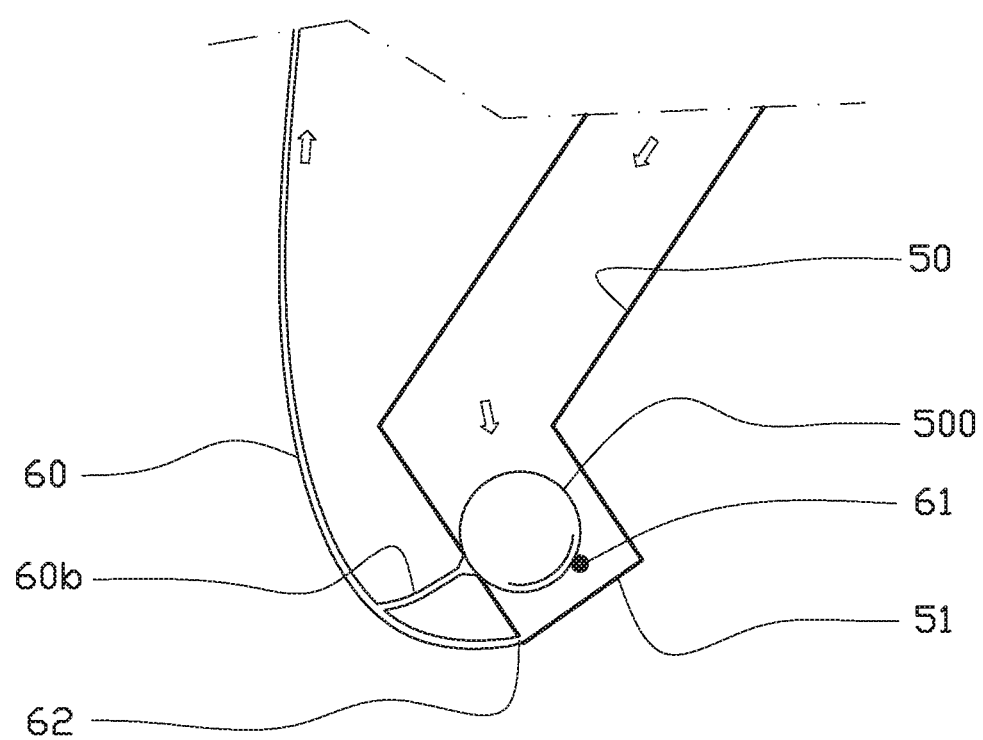
FIG. 9 shows in larger scale a detail of a portion of the apparatus disclosed in FIG. 7.

The suction force on the ball 500, 530 is proportional to the cross-sectional area of the aperture in the wall of the deadlegs 50, 53. Thus, the suction force can be optimised by adjusting the area. This is illustrated in FIG. 9, which shows in larger scale a detail of a portion of the first deadleg 50. The aperture and an end portion of the fluid line 60b has a larger diameter than the rest of the fluid line 60b. By arranging said aperture and end portion with a sufficiently large cross-sectional area, the ball 500 may be retained until chamber 4 is practically filled with water. By increasing said cross sectional area even more, the ball 500 may not be released until production stops and the pressure around the ball 500 is equalized. Therefore, a wide range of operational requirements can be met, both for water and gas, by a combined optimisation of ball density, return line diameter and ball suction area.

Figure 8:
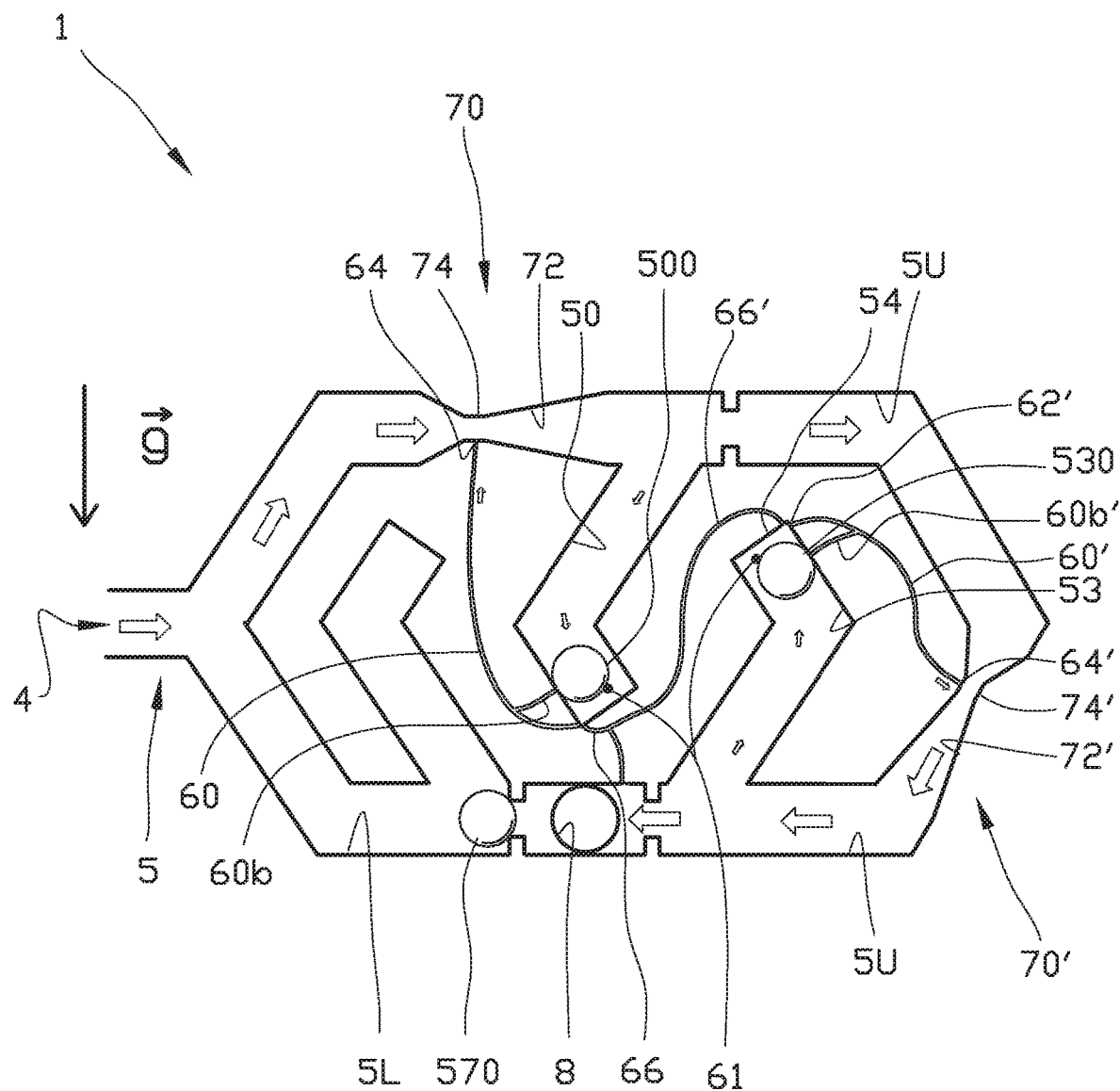

FIG. 8 shows a valve 1 comprising both the drain lines 66, 66' shown in FIG. 6 and the ball-retaining device shown in FIG. 7.

Figure 10A:
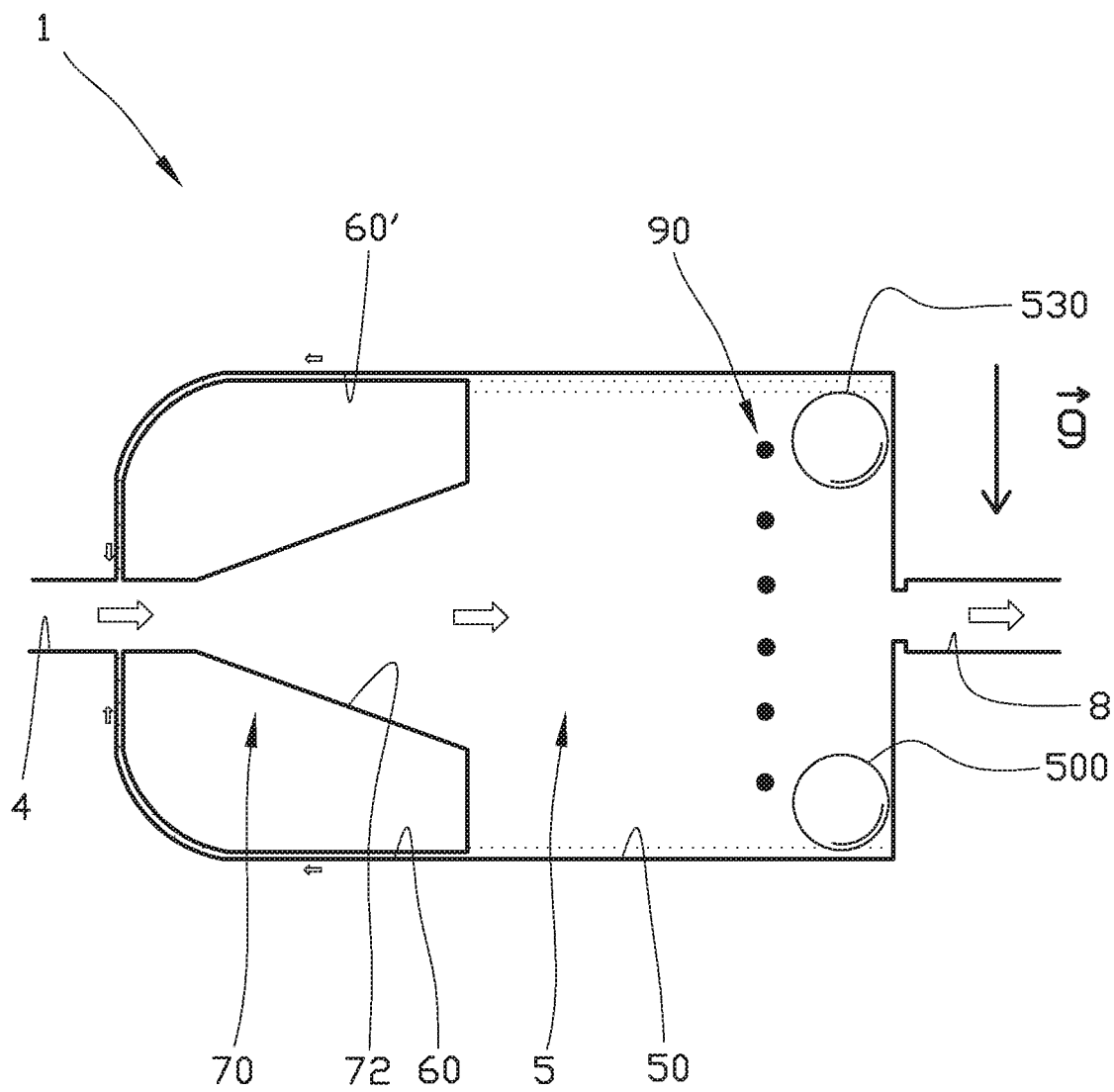
FIGS. 10a-10b show alternative embodiments of the apparatus disclosed in FIGS. 5-8.

FIG. 10a shows an alternative embodiment of the valve 1 according to the present invention.

A major difference between the embodiment shown in FIG. 10a and the embodiment shown in FIGS. 5 to 9 is that the two flow control elements or balls 500 and 530 in FIG. 10a are arranged in one common chamber 50 forming part of the main flow channel 5 having a main inlet 4 and a main outlet 8. The first ball 500 may for example have a density between the density of water (~1000 kg/m$^3$) and oil (~600 kg/m$^3$), for example about 800 kg/m$^3$, while the second ball 530 may have a density between the density of oil (~600 kg/m$^3$) and gas (~200 kg/m$^3$), for example about 400 kg/m$^3$.

A pressure changing means 70 provided by means of an expansion section 72 only, is arranged downstream of the main inlet 4.

When fluid flows through the valve 1, the pressure changing means 70 causes a pressure differential in both a first fluid return conduit 60 and a second fluid return conduit 60' extending from a bottom portion of the chamber 50 and a top portion of the chamber 50, respectively, to a portion of the main flow channel 5 being upstream of said chamber 50.

In the embodiment shown, the fluid flowing through the valve 1 is indicated by large arrows, while fluid being "returned" from the chamber 50 downstream of the pressure changing means 70 and back to the main inlet 4 being upstream of the pressure changing means 70, is indicated by small arrows.

A movement path of the balls 500, 530 between a first non-blocking position and the second blocking position is controlled by a guiding means in the form of a fencing 90. In the embodiment shown, the fencing 90 comprises a plurality of rods (six shown in FIG. 10a) mutually distributed from a top portion to a bottom portion of the chamber 50 to prevent movement of the balls 500, 530 outside the fencing 90.

Any water (indicated by dots) accumulated in the lower portion of the chamber 50 will be sucked via fluid return conduit 60 back to the main flow upstream of the pressure changing means 70. Similarly, any gas (indicated by dots) accumulated in the upper portion of the chamber 50 will via fluid return conduit 60' be sucked to the main flow upstream of the pressure changing means 70.

The outlet of the fluid return conduits 60, 60' may be provided with various geometrical arrangements. An intrusive pipe (not shown) may be used to inject the return flow into a centre portion of the main flow channel 5. Alternatively, a perforated ring (not shown) may be used to inject return fluid uniformly over the cross-sectional area of the main flow channel 5.

In the embodiment shown in FIG. 10a, the fluid return conduits 60, 60' have an inlet immediately downstream of the pressure changing means 70. In order to achieve the same advantages regarding a reduced risk of accidental closing of the valve 1 during normal production, as discussed above in relation to FIGS. 7 and 9, the valve 1 may be arranged with ball retaining devices for providing a certain resistance against movement of the balls 500, 530.

Figure 10B:
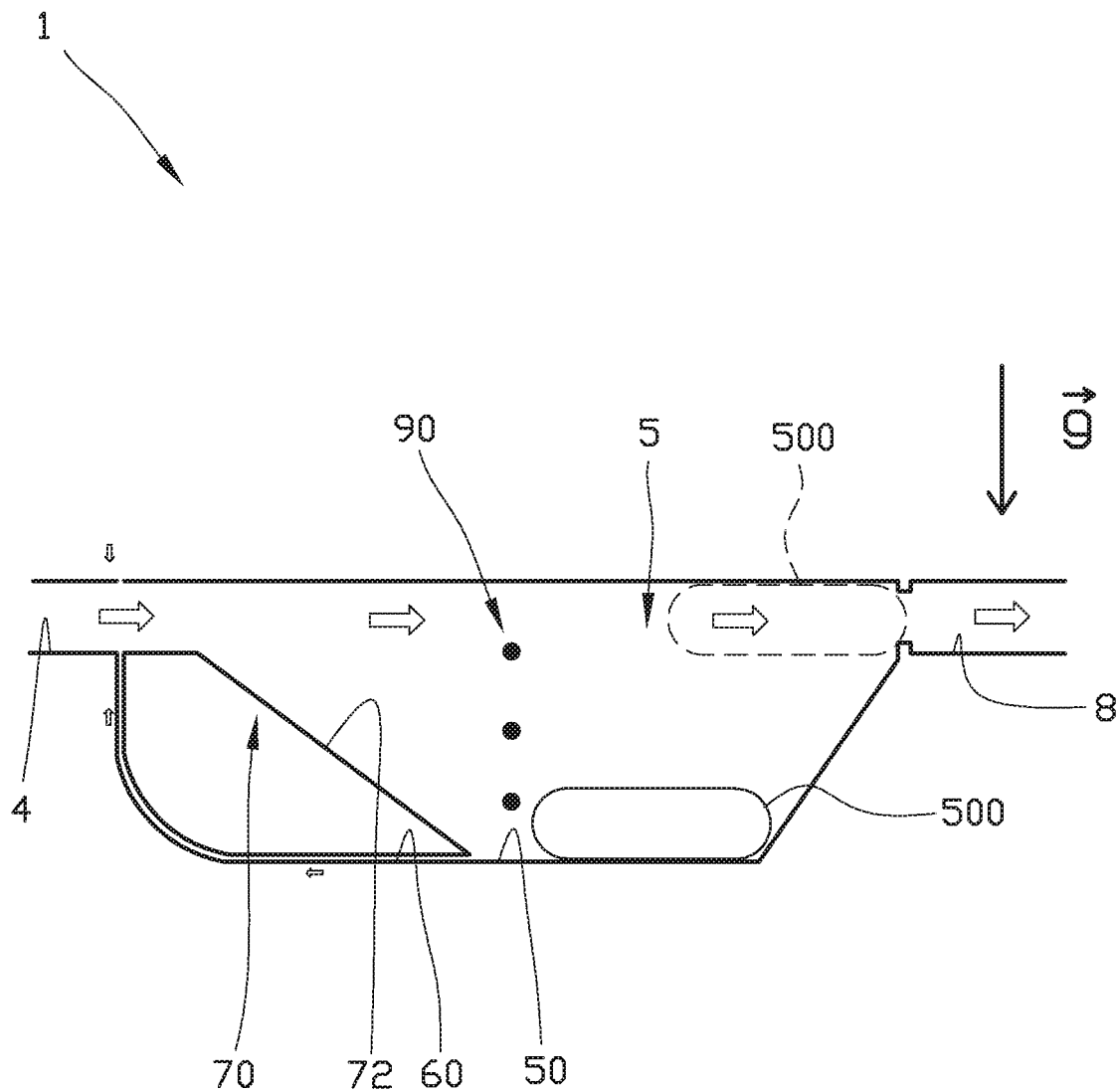

FIG. 10b shows an alternative embodiment of the valve 1 according to the present invention. The valve 1 shown in FIG. 10b resembles the valve 1 shown in FIG. 10a discussed above.

A flow control element 500, here shown as an elongate member 500, is arranged in a flat chamber 50 forming part of a main flow channel 5 having a main inlet 4 and a main outlet 8. When a fluid having a density being higher than the density of the elongate member 500, the elongate member 500 will float upwards and be sucked into receiving means 501 (indicated by elongate member 500 drawn in dotted lines and reference numeral 500 in brackets) and thereby close the valve 1. The flow indicated by arrows will then stop.

An advantage of providing a flow control element 500 having a non-spherical form is that for a given overall thickness of the valve 1, the buoyance force provided by the flow control element 500 may be increased by increasing the volume of the flow control element 500 by increasing the length of the element and not the diameter or thickness.

A pressure changing means 70 provided by means of an expansion section 72 only, is arranged downstream of the main inlet 4.

When fluid flows through the valve 1, the pressure changing means 70 causes a pressure differential in a fluid return conduit 60 extending from a bottom portion of the chamber 50 to a portion of the main flow channel 5 being upstream of said chamber 50.

In the embodiment shown in FIG. 10b, the fluid flowing through the valve 1 is indicated by large arrows, while fluid being "returned" from the chamber 50 downstream of the pressure changing means 70 and back to the main inlet 4 being upstream of the pressure changing means 70, is indicated by small arrows.

A movement path of the elongate member 500 between a first non-blocking position and the second blocking position, is controlled by a guiding means in the form of a fencing 90.

In the embodiment shown, the fencing 90 comprises a plurality of rods (three shown in FIG. 10*b*) mutually distributed from a top portion to a bottom portion of the chamber 50 to prevent movement of the elongate member 500 outside the fencing 90.

Any fluid (for example water) accumulated in the lower portion of the chamber 50 will be sucked via fluid return conduit 60 back to the main flow upstream of the pressure changing means 70.

Figure 11A:
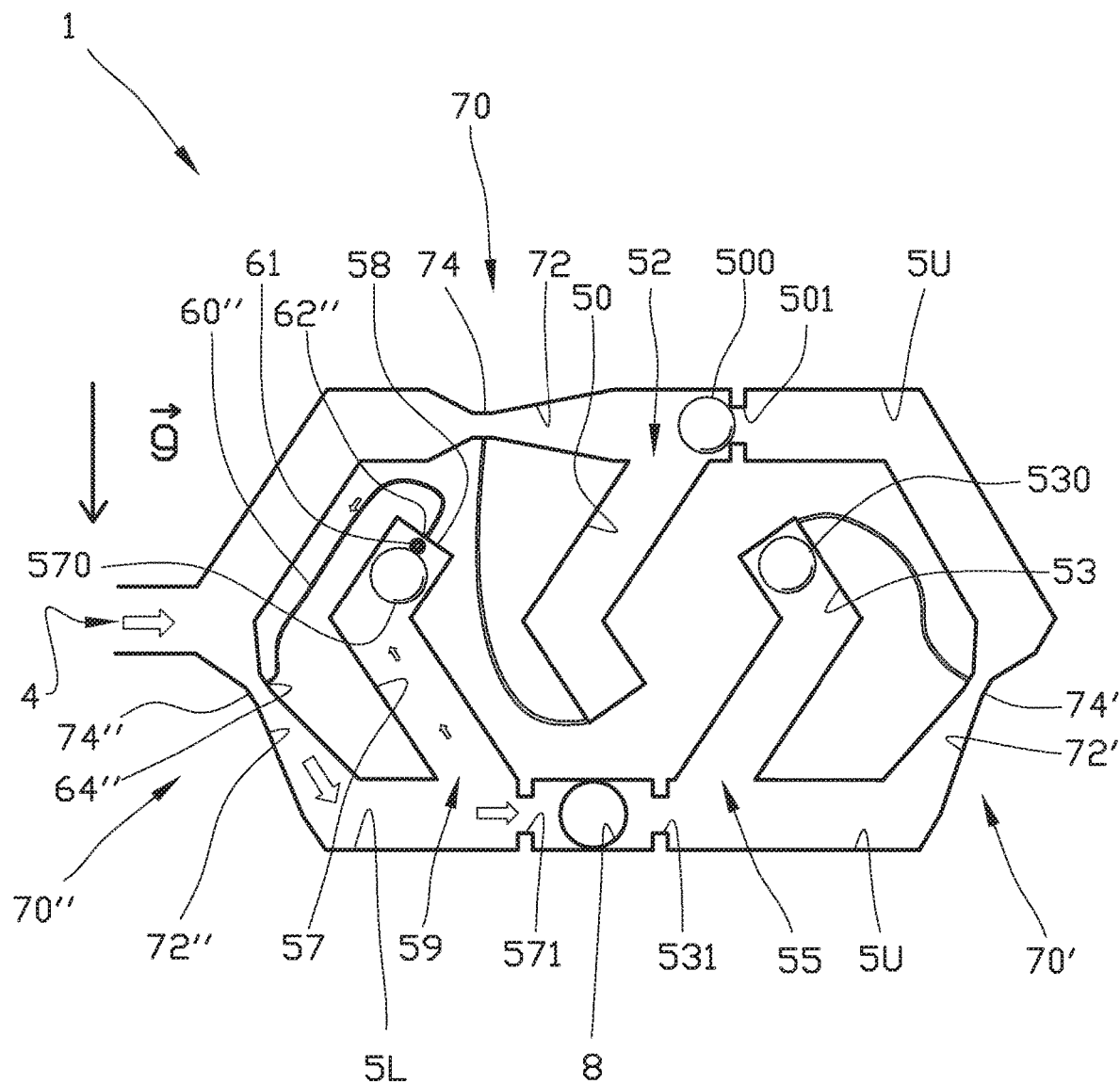
FIGS. 11a-11b show embodiments of an apparatus according to the present invention configured for improved clean-up of a well.
Figure 11B:
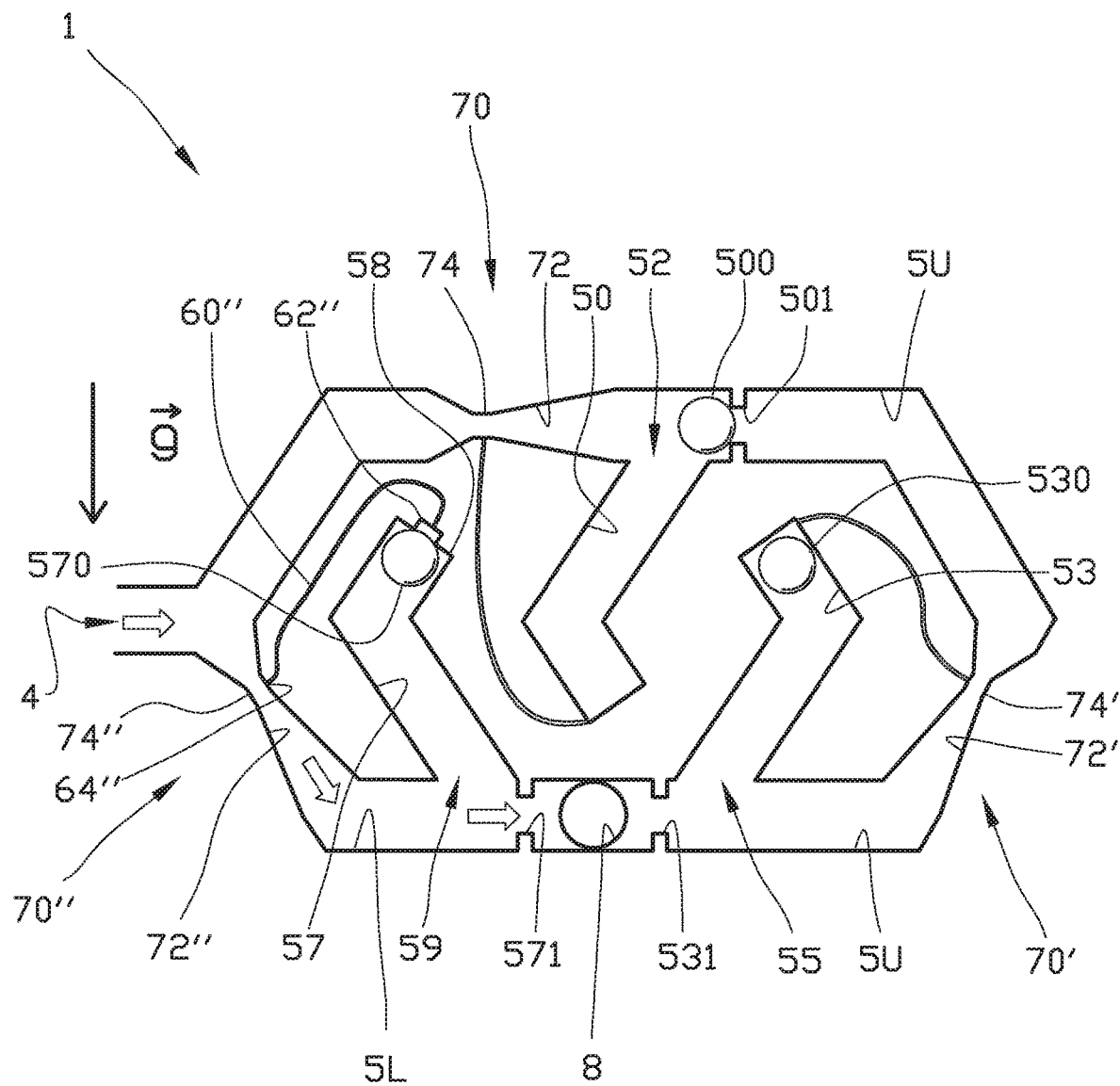

FIGS. 11*a* and 11*b* shows a valve 1 according to the present invention configured for improved clean-up of a well.

FIGS. 11*a* and 11*b* resemble the valve shown in FIGS. 5 to 8. For clarity, some of the reference numerals in FIGS. 5 to 8 are not repeated in FIGS. 11*a* and 11*b*.

The differences between the valve 1 shown in FIGS. 5 to 8 and FIGS. 11*a*-11*b*, are that also the lower flow channel 5L is provided with a pressure changing means 70", and that the third dead leg 57 is provided with a fluid return conduit 60". The fluid return conduit 60" connected with the third dead leg 57 will be denoted third fluid return conduit 60".

The third fluid return conduit 60" has a first end portion 62" being in fluid communication with the first end portion 58 of the third deadleg 57. A second end portion 64" of the third fluid return conduit 60" is in fluid communication with the pressure changing means 70". The pressure changing means 70" comprises an expansion section 72" and a vena contracta 74" arranged upstream of the expansion section 72".

In the embodiment shown, the balls 500, 530, 570 have densities corresponding to the densities discussed in relation to FIGS. 4*a* to 4*d*, and thus to FIGS. 5 to 8 as well.

During clean-up, drilling mud is flowing through the valve 1. Because of the densities of the balls 500, 530, 570 with respect to the drilling mud, all balls 500, 530, 570 "float" in their upper position.

In the embodiment shown, the first end portion 62" of the third fluid return conduit 60" is arranged at a centre portion of the first end portion 58 of the third dead leg 57. To prevent the third ball 570 from blocking the first end portion 62", the third dead leg 57 is provided with a protuberance 61 in the form of a rod. If the first end portion 62" is arranged similar to for example the first end portion 62' of the fluid return conduit 60' of the second dead leg 53, such a protuberance 61 may be superfluous.

When the fluid flow switches from drilling mud to reservoir oil, the third ball 570, which is heavier than oil, will sink down and block the lower flow channel 5L. The first ball 500 is also more dense than oil and should normally sink down, too, but as long as the clean-up process is ongoing, the valve 1 will be exposed to a pressure being lower downstream of the outlet 8 than upstream of the inlet 4, (i.e. lower downstream pressure than upstream pressure of the valve 1) and this pressure differential will cause the first ball 500 to remain in the first ball receiving means 501 until the clean-up process is stopped. Then, the pressure will be equalized and the first ball 500 will automatically be released from the first ball receiving means 501 and move down into the first deadleg 50 and open the upper flow channel 5U for subsequent oil production.

As shown in FIG. 1, a plurality of valves 1 according to the present invention may be arranged along the reservoir. Thus, a plurality of valves 1 shown in FIGS. 11*a* and 11*b* will close one by one during the clean-up process as mud is displaced by reservoir oil. This means that only those valves 1 that still produce mud, contribute significantly to the total flow rate. This mechanism ensures that the drilling mud is removed very efficiently from the full length of the reservoir section.

It is important that the clean-up process is not choked if all valves 1 eventually close. If the sum of leakage rates through the closed valves 1 is insufficient to reach a minimum flow rate that gives stable flow conditions, it is possible to design the valve differently, such that it remains open during the whole clean-up process, also after the mud has been displaced by oil.

FIG. 11*b* shows an embodiment wherein the first end portion 62" of the third fluid return conduit 60" is provided with an enlarged diameter with respect to a diameter of the rest of the third fluid return conduit 60". As discussed above with regards to FIG. 9, the suction force on the ball 570 is proportional to the cross-sectional area of the aperture in the wall of the deadleg 57 where the low pressure keeps the ball 570 in the upper position all the time until the clean-up process is stopped and the pressure equalized.

It is possible to combine the designs in FIG. 11*a* and FIG. 11*b* in the same well W. Typically, the design in FIG. 11*a* will be the preferred design in a heel section of the well, which is normally cleaned up first. The design in FIG. 11*b* will be the preferred design in the toe section of the well, which is normally cleaned up last. When all the mud has finally been removed, the open valves 1 in the toe section will then ensure that the clean-up process can continue at a high and stable flow rate.

The valve 1 according to the present invention may be adapted for so-called WAG- or Water Alternating Gas injection which aims to squeeze more oil out of a reservoir in a formation F.

Figure 12A:
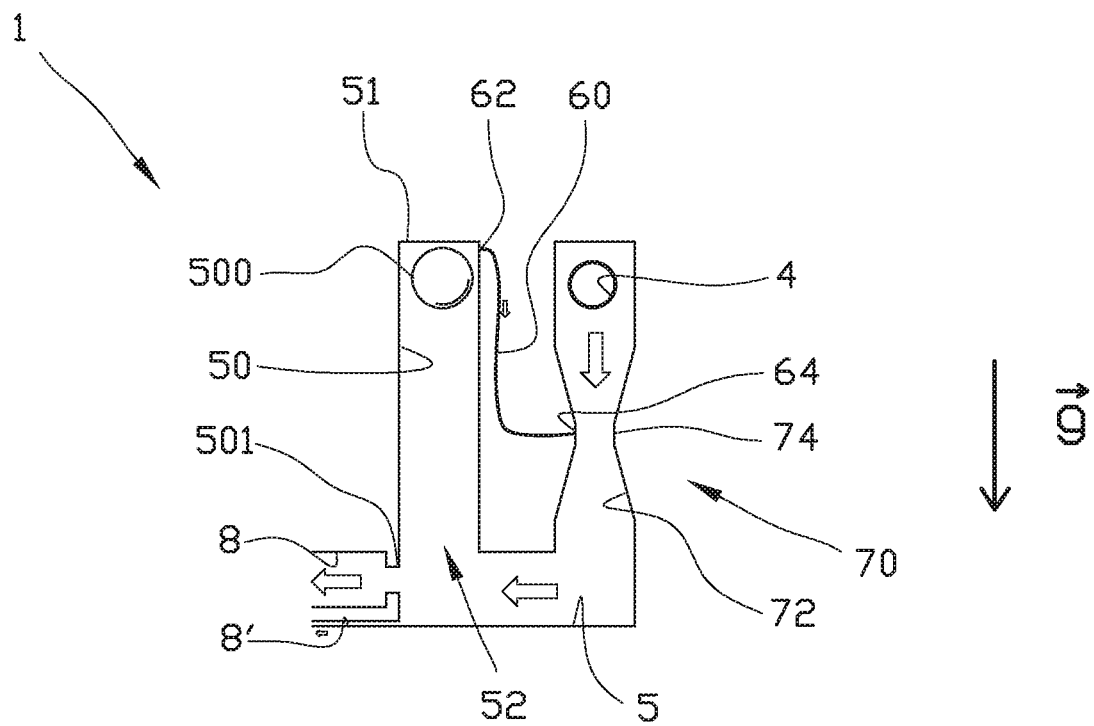
FIGS. 12a-12b show an apparatus according to the present invention adapted for Water Alternating Gas injection.
Figure 12B:
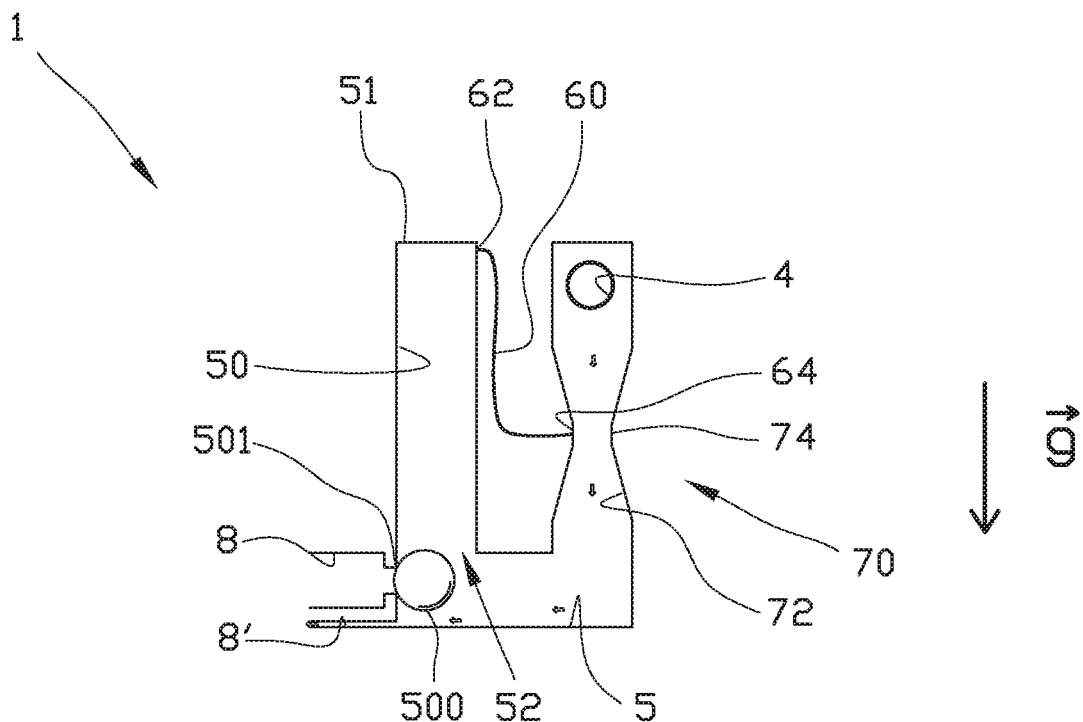

An embodiment of a valve 1 adapted for WAG injection is shown in FIGS. 12*a* and 12*b*.

In a WAG injection process it may be desirable to have a larger flow resistance during gas injection than during water injection. In the embodiment shown in FIGS. 12*a* and 12*b*, this is achieved by means of a flow control element 500 having a density lower than the density of water (~1000 kg/m$^3$), but higher than the density of gas (~200 kg/m$^3$), for example about 600 kg/m$^3$.

FIG. 12*a* shows a situation where water is injected through the valve 1 from an injection inlet 4 to an injection outlet 8. The water injected flows through a flow channel 5 being in fluid communication with said inlet and outlet.

The valve 1 comprises a deadleg 50 being in fluid communication with the flow channel 5. The deadleg 50 comprises a drainage means. The drainage means comprises a fluid return conduit 60 having a first end portion 62 being in fluid communication with a first end portion 51 of the deadleg 50. A second end portion 64 of the fluid return conduit 60 is in fluid communication with a pressure changing means 70 arranged in a portion of the flow channel 5 upstream (to the right) of the deadleg 50. The pressure changing means 70 comprises an expansion section 72 and a vena contracta 74 arranged upstream of the expansion section 72. Thus, in the embodiment shown the pressure changing means 70 is a Venturi tube. Due to the density of the flow control element 500 being less than the density of water, the flow control element or ball 500 will abut the first end portion 51 of the deadleg 50.

When switching from water injection to gas injection, the ball 500 will sink down until it abuts a ball receiving means 501 at the outlet. As mentioned above, the purpose of the ball receiving means 501 is to receive a portion of a surface of the ball 500 to block a fluid flow through the ball receiving means 501.

However, flow of gas out of the valve 1 is still required to allow injection of gas. In the embodiment shown, such a flow is achieved by means of a gas injection outlet 8' provided by means of a conduit having a smaller cross-sectional flow area, i.e. a larger hydraulic resistance, than the injection outlet 8.

As an alternative to the gas injection outlet 8', the ball receiving means 501 in the injection outlet 8, may be configured for allowing a relatively small leakage when the ball 500 abuts the gas receiving means 501, typically by making a receiving portion of the ball receiving means 501 non-complementary with a surface portion of the ball 500. Alternatively, the flow control element 500 may have a non-spherical form, and/or have an uneven surface.

When switching from water injection to gas injection, the valve 1 will close automatically once the deadleg 50 housing the ball 500 becomes gas-filled. However, when switching back from gas injection to water injection, the injection must be stopped once after the valve 1 has become water-filled, such that the pressure can be equalized, thereby releasing the ball 500 from the ball receiving means 501.

When water is injected through the open valve 1 as illustrated in FIG. 12a, it is important that gas bubbles are not permanently trapped inside the deadleg 50 as this would cause gas to accumulate at the top or first end portion 51 of the deadleg 50. Such an accumulation would cause a downward movement of the ball 500 and potentially close the valve 1 accidentally.

Such an accumulation of gas is prevented by means of the pressure changing means 70 and fluid return conduit 60 as discussed in relation to FIGS. 5 to 8 above. Any trapped gas at the top of the deadleg 50 will then be sucked back into the main flow.

A person skilled in the art will appreciate that the valve shown in the previous figures, is dependent on a correct orientation with respect to a gravity vector g.

Figure 13A:
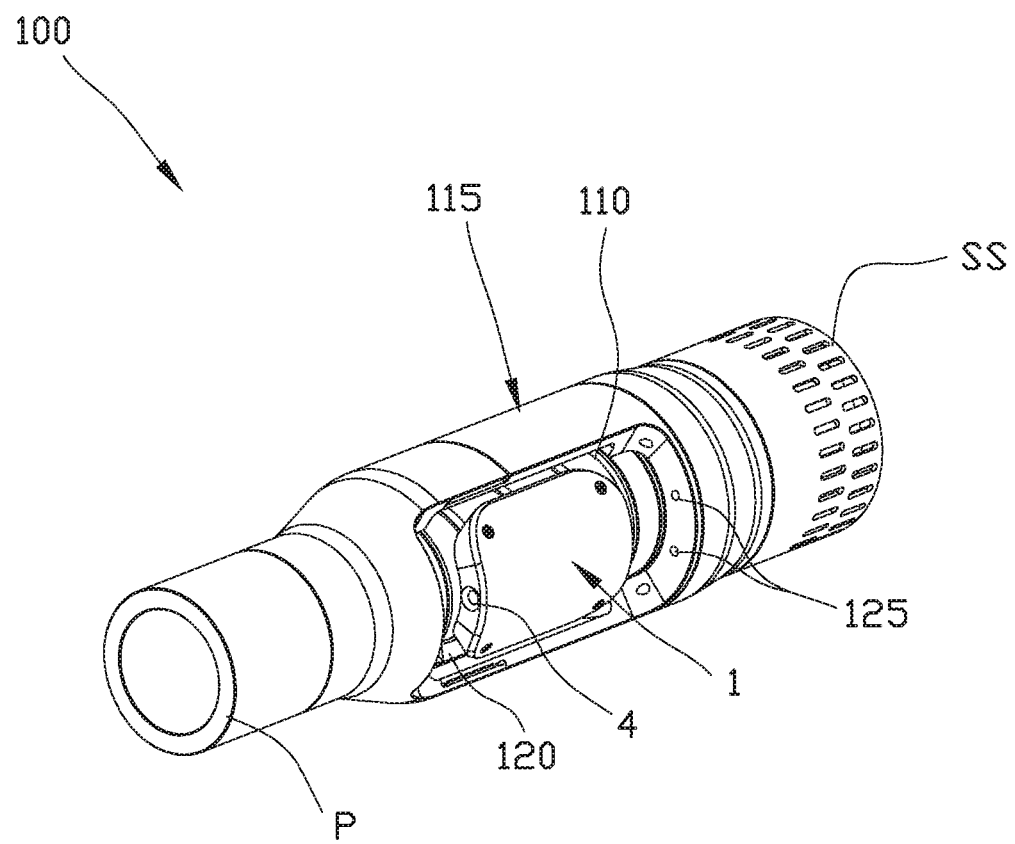
FIG. 13a shows a perspective view of an orientation means suitable for orienting an orientation dependent apparatus.
Figure 13B:
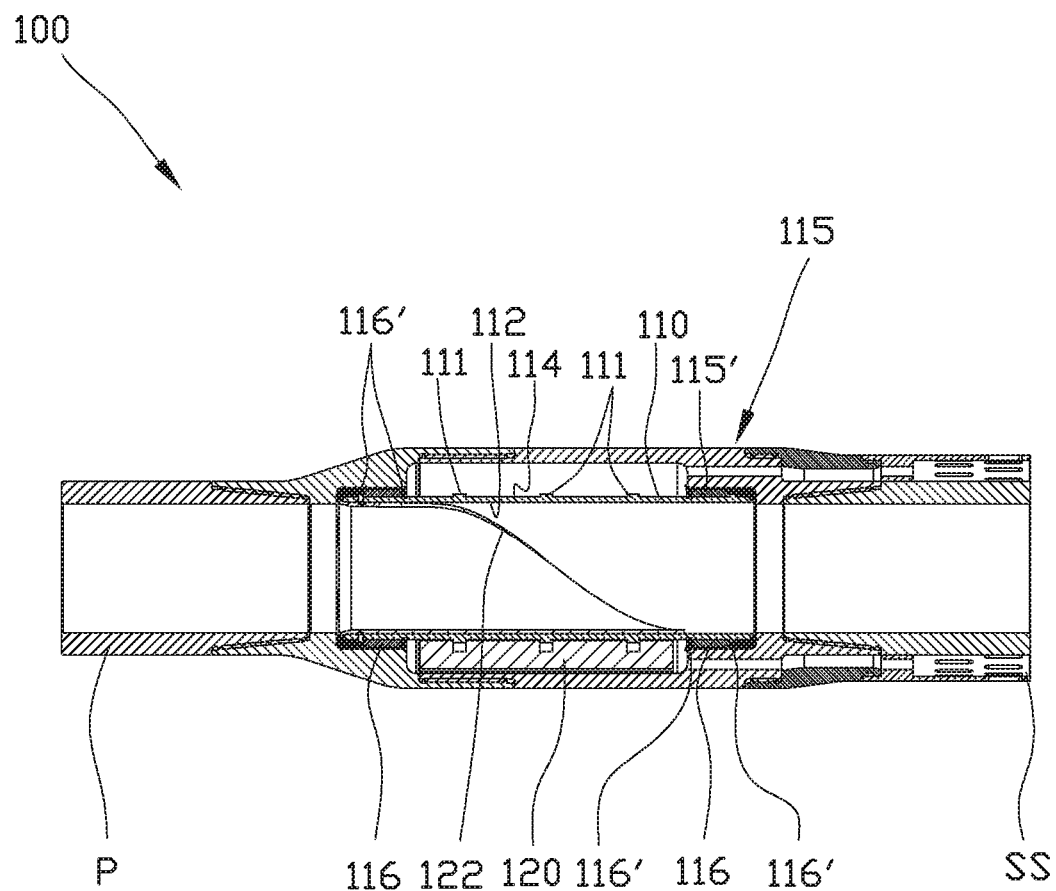
Figure 13C:
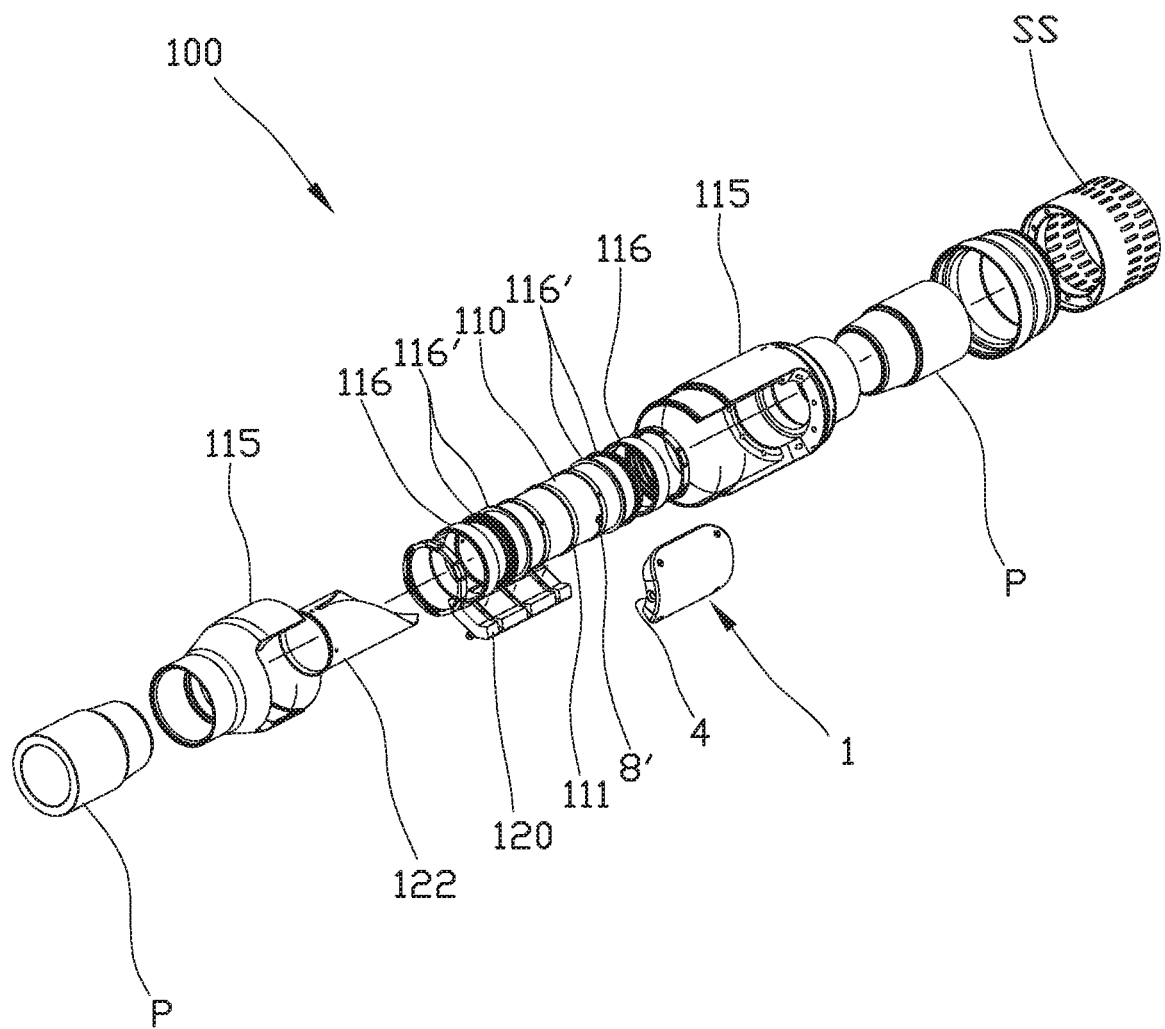

FIGS. 13a to 13c show an orientation means 100 suitable for providing correct orientation of the valve 1 in a horizontal or near-horizontal section of a well.

The orientations means 100 comprises an inner pipe element 110 having an inner surface 112 and an outer surface 114. In the embodiment shown, the inner surface 112 of the inner pipe element 110 is flush (i.e. having same internal diameter) with an inner wall of a base pipe P. In an alternative embodiment (not shown) the inner surface 112 of the inner pipe element 110 may protrude into a fluid flow or so-called well stream.

In the embodiment shown, the orientation means 100 is provided with a rotation device in the form of a weight element 120 connected to a portion of a circumference of the outer surface 114 of the inner pipe element 110, and in the form of a guide track 122 fixedly connected to an inner surface 112 of the inner pipe element 110, wherein the guide track 122 is adapted to receive an external orientation tool (not shown) run into the well W for example on wireline. The guide track 122 is best seen in FIG. 13c.

The inner pipe element 110 is enclosed by a housing 115 which is arranged coaxially with the inner pipe element 110 and connected to the base pipe P. By means of suitable bearings, such as for example slide bearings 111 as shown, the inner pipe element 110 is rotatable within the housing 115. In FIGS. 13a and 13c a hatch (not shown) forming part of the housing 115, has been removed.

The orientation means 100 is further provided with locking means 116 which in the embodiment shown comprises swell packers 116 (two shown) connected to the outer surface 114 of the inner pipe element 110. Each of the swell packers 116 is arranged between two stop rings 116' that provide sideway support of the swell packers 116. The swell packers 116 are responsive to fluid (for example oil or water) such that upon swelling, the swell packers 116 will abut an inner surface of the housing 115 and thus prevent rotation of the inner pipe element 110 with respect to the housing 115. Alternatively, lips seals (not shown) responsive to a pressure differential, may prevent rotation of the inner pipe element 110 with respect to the housing 115.

In the embodiment shown, a sand screen SS is connected to the base pipe P. Typically, fluid will first flow through the sand screen SS, then through a channel system 125 into an annular volume between the inner pipe element 110 and the housing 115. The fluid then flows through a main inlet 4 of the valve 1, through the valve 1 and out of the main outlet 8 (see FIG. 5) and finally through an aperture 8' (see FIG. 13c) in the inner pipe element 110 being in fluid communication with the main outlet 8 of the valve 1, and into the inner pipe element 110.

FIG. 13c further shows various items which will be known to a person skilled in art, and are therefore not described.

From the above, a person skilled in the art will appreciate that the valve 1 according to the present invention is an autonomous inflow control device that when correctly installed in a well will at least reducethe risk of undesired closing of the valve controlling fluid flow in, into or out of a well.

A correct orientation of the valve 1 may be achieved by means of the orientation means disclosed herein.

It should be noted that the above-mentioned embodiments illustrate rather than limit the invention, and that those skilled in the art will be able to design many alternative embodiments without departing from the scope of the invention which is defined by the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An apparatus for controlling a fluid flow in, into or out of a well, the apparatus comprising:
   a main flow channel having an inlet and an outlet being in fluid communication with the fluid flow; and
   at least one chamber forming part of, or connected in fluid communication with, the main flow channel, the chamber configured for housing at least one flow control element movable between a first position where the flow control element does not block the fluid flow between the inlet and the outlet of the main flow channel, and a second position within or outside of the chamber wherein the flow control element blocks the fluid flow between the inlet and the outlet of the main flow channel, the flow control element movable in response to density of fluid in said chamber;
   wherein the main flow channel is provided with pressure changing means comprising an expansion section arranged in the main flow channel, the expansion section having an expansion section inlet with a smaller cross sectional flow area than a cross sectional flow area at an expansion section outlet, the pressure changing means providing a pressure differential in a fluid return conduit comprising a fluid path being separate from the fluid flow between the inlet and the outlet of the main flow channel, the fluid return conduit extending between said chamber at a location wherein the flow control element is in the non-blocking position and a portion of the main flow channel being within or upstream of the pressure changing means, so that fluid in said chamber is recirculated back to the main flow channel when the main flow channel is open.

2. The apparatus according to claim 1, wherein the pressure changing means is arranged upstream of the at least one chamber.

3. The apparatus according to claim 2, wherein the pressure changing means further comprises a vena contracta arranged upstream of the expansion section.

4. The apparatus according to claim 2, wherein the at least one flow control elementapparatus comprises at least two flow control elements of different characteristics.

5. The apparatus according to claim 1, wherein the pressure changing means further comprises a vena contracta arranged upstream of the expansion section.

6. The apparatus according to claim 5, wherein the at least one flow control element comprises at least two flow conrol elements of different characteristics.

7. The apparatus according to claim 1, wherein the at least one flow control element comprises at least two flow control elements of different characteristics.

8. The apparatus according to claim 1, wherein a movement path of the flow control element between the first non-blocking position and the second blocking position is controlled by a guiding means.

9. The apparatus according to claim 8, wherein the guiding means is a guiding channel with a closed first end portion and an open second end portion, the second end portion being in fluid communication with a portion of the main flow channel for allowing the flow control element to move into the main flow channel and sealingly abut a flow control element movement stopping device arranged downstream of the open second end portion of the guiding channel.

10. The apparatus according to claim 9, wherein the fluid return conduit is connected to the guiding channel in a portion being closer to the first end portion of the guiding channel than the second end portion of the guiding channel.

11. The apparatus according to claim 10, wherein the guiding channel is further provided with a leakage channel being in fluid communication with a portion of the outlet of the main flow channel.

12. An apparatus for controlling a fluid flow in, into or out of a well, the apparatus comprising:
 a main flow channel having an inlet and an outlet being in fluid communication with the fluid flow; and
 at least one chamber forming part of, or connected in fluid communication with, the main flow channel, the chamber configured for housing at least one flow control element movable between a first position where the flow control element does not block the fluid flow between the inlet and the outlet of the main flow channel, and a second position within or outside of the chamber wherein the flow control element blocks the fluid flow between the inlet and the outlet of the main flow channel, the flow control element movable in response to density of fluid in said chamber;
 wherein the main flow channel is provided with pressure changing means comprising an expansion section arranged in the main flow channel, the expansion section having an expansion section inlet with a smaller cross sectional flow area than a cross sectional flow area at an expansion section outlet, the pressure changing means providing a pressure differential in a fluid return conduit comprising a fluid path being separate from the fluid flow between the inlet and the outlet of the main flow channel, the fluid conduit extending between said chamber at a location wherein the flow control element is in the non-blocking position and a portion of the main flow channel being within or upstream of the pressure changing means, so that fluid in said chamber is recirculated back to the main flow channel when the main flow channel is open;
 wherein a movement path of the flow control element between the first non-blocking position and the second blocking position is controlled by a guiding means;
 wherein the guiding means is a guiding channel with a closed first end portion and an open second end portion, the second end portion being in fluid communication with a portion of the main flow channel for allowing the flow control element to move into the main flow channel and sealingly abut a flow control element movement stopping device arranged downstream of the open second end portion of the guiding channel;
 wherein the fluid return conduit is connected to the guiding channel in a portion being closer to the first end portion of the guiding channel than the second end portion of the guiding channel
 wherein the guiding channel is further provided with a leakage channel being in fluid communication with a portion of the outlet of the main flow channel; and
 wherein the fluid return conduit is provided with a branching having an end portion being in fluid communication with the guiding channel, said end portion being complementary to a surface portion of the flow control element abutting a wall of the guiding channel when in the first non-blocking position.

13. The apparatus according to claim 12, wherein the end portion of the branching is further provided with an enlarged end portion.

14. An orientation means for orienting an apparatus in a horizontal or near- horizontal section of a well, the apparatus comprising;
 a main flow channel having an inlet and an outlet being in fluid communication with the fluid flow; and
 at least one chamber forming part of, or connected in fluid communication with, the main flow channel, the chamber configured for housing at least one flow control element movable between a first position where the flow control element does not block the fluid flow between the inlet and the outlet of the main flow channel, and a second position within or outside of the chamber wherein the flow control element blocks the fluid flow between the inlet and the outlet of the main flow channel, the flow control element movable in response to density of fluid in said chamber;
 wherein the main flow channel is provided with pressure changing means comprising an expansion section arranged in the main flow channel, the expansion section having an expansion section inlet with a smaller cross sectional flow area than a cross sectional flow area at an expansion section outlet, the pressure changing means providing a pressure differential in a fluid return conduit comprising a fluid path being separate from the fluid flow between the inlet and the outlet of the main flow channel, the fluid conduit extending between said chamber at a location wherein the flow control element is in the non-blocking position and a portion of the main flow channel being within or upstream of the pressure changing means, so that fluid in said chamber is recirculated back to the main flow channel when the main flow channel is open;
the orientation means comprising:
an inner pipe element having an inner surface for communicating fluid with a base pipe, and an outer surface;
a rotation device connected to a portion of the inner pipe element;
a housing for enclosing at least a portion of the inner pipe element, the rotation device and the apparatus being connected to the inner pipe element, the housing being arranged coaxially with the inner pipe element and configured for allowing rotation of the inner pipe element with respect to the housing; and
locking means arranged between an inner surface of the housing and the outer surface of the inner pipe element, the locking means being reactive to a fluid flowing in the apparatus such that rotation of the inner pipe element is prevented upon activation of the locking means.

15. The orientation means according to claim 14, wherein the locking means comprises one of or a combination of a swell packer and a lip seal.

16. The orientation means according to claim 14, wherein the rotation device comprises a weight element connected to a portion of a circumference of the outer surface of the inner pipe element.

17. The orientation means according to claim 16, wherein the orientation means comprises a combination of a weight element and a guide track.

18. The orientation means according to claim 14, wherein the rotation device comprises a guide track fixedly connected to an inner surface of the inner pipe element, wherein the guide track is adapted to receive an external orientation tool run into the well.

19. A method for controlling fluid flow in, into or out of a well, the method comprising the steps of:
mounting an apparatus as part of a well completion string prior to inserting the string in the well wherein the apparatus comprises:
a main flow channel having an inlet and an outlet being in fluid communication with the fluid flow; and
at least one chamber forming part of, or connected in fluid communication with, the main flow channel, the chamber configured for housing at least one flow control element movable between a first position where the flow control element does not block the fluid flow between the inlet and the outlet of the main flow channel, and a second position within or outside of the chamber wherein the flow control element blocks the fluid flow between the inlet and the outlet of the main flow channel, the flow control element movable in response to density of fluid in said chamber;
wherein the main flow channel is provided with pressure changing means comprising an expansion section arranged in the main flow channel, the expansion section having an expansion section inlet with a smaller cross sectional flow area than a cross sectional flow area at an expansion section outlet, the pressure changing means providing a pressure differential in a fluid return conduit comprising a fluid path being separate from the fluid flow between the inlet and the outlet of the main flow channel, the fluid return conduit extending between said chamber at a location wherein the flow control element is in the non-blocking position and a portion of the main flow channel being within or upstream of the pressure changing means, so that fluid in said chamber is recirculated back to the main flow channel when the main flow channel is open;
bringing the well completion string into the well;
orienting the apparatus within the well; and
flowing fluid in, into or out of the well.

20. The apparatus according to claim 8, An apparatus for controlling a fluid flow in, into or out of a well, the apparatus comprising:
a main flow channel having an inlet and an outlet being in fluid communication with the fluid flow; and
at least one chamber forming part of, or connected in fluid communication with, the main flow channel, the chamber configured for housing at least one flow control element movable between a first position where the flow control element does not block the fluid flow between the inlet and the outlet of the main flow channel, and a second position within or outside of the chamber wherein the flow control element blocks the fluid flow between the inlet and the outlet of the main flow channel, the flow control element movable in response to density of fluid in said chamber;
wherein the main flow channel is provided with pressure changing means comprising an expansion section arranged in the main flow channel, the expansion section having an expansion section inlet with a smaller cross sectional flow area than a cross sectional flow area at an expansion section outlet, the pressure changing means providing a pressure differential in a fluid return conduit extending between said chamber at a location wherein the flow control element is in the non-blocking position and a portion of the main flow channel being within or upstream of the pressure changing means, so that fluid in said chamber is recirculated back to the main flow channel when the main flow channel is open;
wherein a movement path of the flow control element between the first non-blocking position and the second blocking position is controlled by a guiding means;
wherein the guiding means is a guiding channel with a closed first end portion and an open second end portion, the second end portion being in fluid communication with a portion of the main flow channel for allowing the flow control element to move into the main flow channel and sealingly abut a flow control element movement stopping device arranged downstream of the open second end portion of the guiding channel;
wherein the fluid return conduit is connected to the guiding channel in a portion being closer to the first end portion of the guiding channel than the second end portion of the guiding channel wherein the guiding channel is further provided with a leakage channel being in fluid communication with a portion of the outlet of the main flow channel; and
wherein the fluid return conduit is provided with a branching having an end portion being in fluid communication with the guiding channel, said end portion being complementary to a surface portion of the flow control element abutting a wall of the guiding channel when in the first non- blocking position.

* * * * *